United States Patent
Nishibori et al.

(10) Patent No.: US 7,050,108 B2
(45) Date of Patent: May 23, 2006

(54) MOTION VECTOR CORRECTION CIRCUIT AND METHOD

(75) Inventors: Kazuhiko Nishibori, Kanagawa (JP); Koji Aoyama, Saitama (JP); Yukihiko Mogi, Kanagawa (JP); Takaya Hoshino, Saitama (JP); Makoto Kondo, Kanagawa (JP)

(73) Assignee: Sony Corporation, Tokyo (JP)

( * ) Notice: Subject to any disclaimer, the term of this patent is extended or adjusted under 35 U.S.C. 154(b) by 521 days.

(21) Appl. No.: 10/440,848

(22) Filed: May 19, 2003

(65) Prior Publication Data

US 2003/0215016 A1 Nov. 20, 2003

(30) Foreign Application Priority Data

May 20, 2002 (JP) .......................... P2002-145265

(51) Int. Cl.
*H04N 7/01* (2006.01)
*H04N 11/20* (2006.01)

(52) U.S. Cl. ...................... 348/459; 348/699; 348/452; 348/700; 375/240.16; 382/236; 382/254; 382/278

(58) Field of Classification Search ............... 348/441, 348/459, 699–701; 375/240.16; 382/236, 382/254, 278; H04N 7/12; G06K 9/40
See application file for complete search history.

(56) References Cited

U.S. PATENT DOCUMENTS

| | | | | |
|---|---|---|---|---|
| 5,353,119 A * | 10/1994 | Dorricott et al. | ........... | 348/446 |
| 5,796,437 A * | 8/1998 | Muraji et al. | ............... | 348/452 |
| 5,832,101 A * | 11/1998 | Hwang et al. | .............. | 382/107 |
| 6,005,639 A * | 12/1999 | Thomas et al. | ............. | 348/699 |
| 6,278,736 B1 * | 8/2001 | De Haan et al. | ........ | 375/240.16 |
| 6,532,264 B1 * | 3/2003 | Kahn | ..................... | 375/240.16 |
| 6,735,250 B1 * | 5/2004 | Inou | ...................... | 375/240.01 |
| 6,754,371 B1 * | 6/2004 | Kondo et al. | ................ | 382/107 |
| 6,766,055 B1 * | 7/2004 | Matsugu et al. | ............ | 382/173 |
| 6,895,361 B1 * | 5/2005 | Yang | .......................... | 702/179 |
| 6,900,846 B1 * | 5/2005 | Lee et al. | .................... | 348/459 |
| 6,947,094 B1 * | 9/2005 | Hoshino et al. | ............ | 348/441 |
| 6,970,605 B1 * | 11/2005 | Kondo et al. | ................ | 382/254 |
| 6,985,604 B1 * | 1/2006 | Braspenning et al. | ....... | 382/107 |
| 2001/0008545 A1 * | 7/2001 | Takeda et al. | ......... | 375/240.16 |
| 2002/0171759 A1 * | 11/2002 | Handjojo et al. | .......... | 348/452 |
| 2003/0194151 A1 * | 10/2003 | Wang et al. | ................ | 382/300 |
| 2003/0227973 A1 * | 12/2003 | Nishibori et al. | ...... | 375/240.16 |
| 2004/0022448 A1 * | 2/2004 | Kondo et al. | ............... | 382/254 |
| 2005/0185059 A1 * | 8/2005 | Ohki | ..................... | 348/208.99 |

* cited by examiner

*Primary Examiner*—Brian P. Yenke
(74) *Attorney, Agent, or Firm*—Frommer Lawrence & Haug LLP; William S. Frommer

(57) ABSTRACT

It is determined whether each block (51) including a plurality of pixels extracted from a basic field (30) has an edge or not, and then which state, stationary or non-stationary, each of the pixels forming together the block (51) determined to have an edge is. There is calculated an absolute value of a difference between a pixel determined to be non-stationary and a pixel (91 or 92) in each pixel position in a reference field (40) or pixels (82 to 85) included in the reference field and adjacent to the non-stationary pixel, and a correlation is found between such pixels in consideration according to the calculated difference absolute-value. A motion vector is determined by the block matching method according to results of the determination, and allocated to each of the pixels. Thus, the motion vector of each block is corrected to an accurate one of each of the pixels.

16 Claims, 17 Drawing Sheets

MOTION VECTOR CORRECTION CIRCUIT AND METHOD

BACKGROUND OF THE INVENTION

1. Field of the Invention

The present invention generally relates to a motion vector correction circuit and method, and more particularly to a circuit for, and a method of, correcting a motion vector determined by the block matching method.

This application claims the priority of the Japanese Patent Application No. 2002-145265 filed on May 20, 2002, the entirety of which is incorporated by reference herein.

2. Description of the Related Art

Heretofore, the TV broadcasting systems have adopted most widely the interlaced scanning or interlacing in which the electron beam is scanned across the screen once every other horizontal scan line. In the interlacing, a field image formed from odd scan lines and a one formed from even scan lines, form together one frame image. An image interlaced with a low frequency incurs a flicker in screen (will be referred to as "screen flicker" hereunder) which will degrade the on-screen image quality.

Also, the interlacing is adopted as the television standard over the world. For example, the PAL (phase alternation by line) system is one of such television standards, prevailing in the European countries. In the PAL system, the field frequency is 50 Hz (a frame image is formed from 25 frames/sec and a field image is formed from 50 fields/sec).

More specifically, to suppress the screen flicker, the PAL system has adopted the field frequency doubling technique which converts a field frequency of 50 Hz into a one of 100 Hz by interpolating or otherwise processing an input image signal.

FIG. 1 shows a block diagram of a field frequency doubler circuit 5 having the field frequency doubling technique applied therein. As shown, the field frequency doubler circuit 5 is formed integrally in a television receiver 6 including an input terminal 64, horizontal/vertical deflection circuit 65 and a CRT 63. The field frequency doubler circuit 5 includes a frequency-doubling converter 55 and a frame memory 52.

The frequency-doubling converter 55 is supplied with a PAL-based image signal of 50 fields/sec from the input terminal 61 and writes the signal to the frame memory 52. The frequency-doubling converter 55 reads the image signal from the frame memory 52 at a speed double that at which the image signal was written. Thus, it is possible to double the frequency of the 50-fields/sec image signal and produce a 100-fields/sec image signal.

The frequency-doubling converter 55 supplies the frequency-doubled image signal to the CRT 63. The CRT 63 will display the supplied image signal on a screen thereof. It should be noted that in the CRT 63, the horizontal and vertical deflection of the image signal is controlled according to a horizontal/vertical sawtooth wave of the frequency double that of the input image signal, produced by the horizontal/vertical deflection circuit 62.

FIGS. 2A and 2B show the relation between each field and pixel position before and after subjected to the frequency-doubling conversion. In FIGS. 2A and 2B, the horizontal axis indicates a time and the vertical axis indicates a vertical position of a pixel. Also, the small blank circle in FIG. 2A indicates an interlaced image signal of 50 fields/sec before subjected to the frequency-doubling conversion, and the small hatched circle in FIG. 2B indicates an interlaced image-signal of 100 fields/sec after subjected to the frequency-doubling conversion.

In the image signal shown in FIG. 2A, fields f1 and field f2 are signals produced from the same frame in a film, and similarly, fields f3 and f4 are signals produced from the frame. Since these image signals are interlaced ones, adjacent fields are different in vertical pixel position from each other. Thus, a new field cannot be produced between fields while maintaining the interlaced state.

On this account, two fields f2' and f1' are newly produced between the fields f1 and f2, and two fields f4' and f3' are produced between the fields f3 and f4 with no fields being produced between the fields f2 and f3, as shown in FIG. 2B. Say, one frame is formed from four fields, namely, two frames.

Each of the newly formed fields f1', f2', . . . may have its own pixel value determined as a mean value, respectively, of three-pixels surrounding that pixel by a median filter or the like in some cases. Also, the new fields f1', f2', . . . will have the same contents as the fields f1, f2, . . . , respectively.

That is, the field frequency doubler circuit 5 can increase the number of images per unit time and thus suppress the aforementioned screen flicker by producing two new fields and no new fields alternately between fields of an: image signal before subjected to the frequency-doubling conversion.

FIG. 3A shows the relation between each field and image position with a television signal (will be referred to as "TV signal" hereinafter) being not yet subjected to the frequency-doubling conversion when the image moves horizontally. As shown in FIG. 3A, since the fields f1, f2, f3, . . . belong to independent frames, respectively, the image will appear in another position. The image will move horizontally (to the right) each time it shifts from the field f1 to the field f2, f3 . . . .

By doubling the frequency of the image signal in the TV signal shown in FIG. 3A by the field frequency doubling technique, the same image will appear in the same position when the fields f1 and f2' form together the same frame as shown in FIG. 3B. Similarly, with the fields f1' and f2 forming together the same frame, the same image appears in the same position.

Note that since an output image signal regularly forms each field in a 1/100-sec cycle, the image-moving time zone is shorter than the image-stationary time zone and thus the image motion actually appears discontinuous when it is viewed on a CRT. A typical example of the conventional solutions to this "discontinuous image motion" problem is to break an image into blocks, each including a predetermined number of pixels, and determine the similarity between the blocks by the block matching method, for example, in order to determine a motion vector and correct the image motion by shifting pixel positions in each of the blocks according to the motion vector thus determined.

Note the block matching method is a technique to break a basic field 80 into a plurality of basic blocks 101, detect a block most similar to the basic blocks 101 in the basic field 80 from a search block 103 moved within a search range 104 in a reference field 90, and take, as a motion vector, a positional deviation (in direction and magnitude of a motion) between the detected search block 103 and basic block 101, as shown in FIG. 4.

For determination of the above similarity, a difference of each pixel value of the search block 103 from a pixel value corresponding to the basic block 101 is determined, and then an assessment value sum represented by the difference, for example, a difference absolute-value sum, is determined. Next, this procedure is repeated for all the search blocks 103, and a minimum one is determined of assessment value sums, that is, difference value sums. The search block 103 showing the minimum difference sum is taken as showing the highest similarity to the basic block 101, and a vector that can be determined between a pixel at the origin of such a block and a pixel at the origin of the basic block 101 is taken as a motion vector.

FIG. 5 shows a motion correction circuit 7 which uses the block matching method to make motion correction of an image signal having the frequency thereof doubled by the field frequency doubler circuit 5.

As shown, the motion correction circuit 7 includes an image memory 71, motion vector detector 72 and an image shifter 73.

The image memory 71 is sequentially supplied with interlaced image signals having been doubled in frequency by the aforementioned field frequency doubler circuit 5 and one frame of which is composed of four fields each having a field frequency of 100 fields/sec. The image memory 71 will store the supplied image signals in units of a field for one frame. Say, an image signal outputted from the image memory 71 will have a one-frame delay in relation to an image signal supplied to the image memory 71.

The motion vector detector 72 is sequentially supplied with the basic fields 80 for supply to the image memory 71 and with the reference fields 90 supplied from the image memory 71 and delayed one frame in relation to the basic field 80. The motion vector detector 72 extracts the basic block 101 from the basic field 80, and the search block 103 from the reference field 90, and determines a motion vector by the block matching method. The motion vector detector 72 sends the motion vector detected at each pixel or block to the image shifter 73.

The image shifter 73 is supplied with the image signal delayed one frame in relation the input image signal from the image memory 71. The image shifter 73 receives the motion vector from the motion vector detector 72. Also, the image shifter 73 shifts each block of the supplied image signal within the range of the received motion vector and in the direction of a motion vector, and supplies the blocks thus shifted to a CRT 74.

However, the conventional motion correction circuit. 7 adopting the block matching method forms one block from so many pixels as 16×4 pixels for example in order to minimize the load to the entire circuit by reducing the operational amount. Within the block formed from such many pixels, pixels actually move differently from each other. In such a case, if an image is shifted in blocks by the image shifter 73 in the direction of a motion vector, the motion vector will inaccurately be determined in pixels, possibly causing an image quality degradation and operational failure on each area.

In a scene that a person 122 moves to the right before a stationary window 121 as shown in FIG. 6A, for example, when a motion vector is detected for each of gridironed basic blocks 101, the motion vector of the basic blocks 101 including the person 122 is a rightward motion vector 123. On the other hand, the basic blocks 101 not including the person 122 will show zero motion vector.

When a motion correction is done by shifting each block according to such a rightward motion vector 123, however, parts (121a and 121b in FIG. 6B) of the window 121 also moves correspondingly to the motion of the person 122 as shown in FIG. 6B, resulting in a gap 124. Say, in case pixels forming together a block actually move differently from each other, a visually unnatural image will result.

SUMMARY OF THE INVENTION

It is therefore an object of the present invention to overcome the above-mentioned drawbacks of the related art by suppressing degradation in quality of a frequency-doubled image by correcting a motion vector of each block of the image, determined by the block matching method, to an accurate one of each of the pixels of the image.

The above object can be attained by providing a motion vector correction circuit which corrects a motion vector determined by the block matching method, on each of pixels in a basic field that is one frame before a reference field supplied thereto, the circuit including according to the present invention:

an edge determining means for determining whether each block including a plurality of pixels extracted from the basic field has an edge or not;

a stationary/non-stationary-state determining means for determining in which state, stationary or non-stationary, each of the pixels forming together one of the blocks which has been determined by the edge determining means to have an edge is, on the basis of an absolute value of a difference between the pixel and a pixel in the same pixel position in the reference field;

a correlation determining means for calculating an absolute value of a difference between a pixel having been determined by the stationary/non-stationary-state determining means to be non-stationary and a pixel in each pixel position in the reference field to determine a correlation between such pixels;

a peripheral pixel determining means for calculating an absolute value of a difference between a pixel on which no correlation is found and pixels adjacent to the pixel in the basic field to determine a correlation between the non-correlative pixel and one of the adjacent pixels on the basis of the difference absolute-value thus calculated; and a motion vector allocation means for allocating, on each of the pixels, a motion vector determined by the block matching method according to results of the determination made by the edge determining means and stationary/non-stationary-state determining means and in the correlation determining means and peripheral pixel determining means.

Also the above object can be attained by providing a motion vector correction method of correcting a motion vector determined by the block matching method, on each of pixels in a basic field that is one frame before an input reference field, the method including, according to the present invention, the steps of:

determining whether each block including a plurality of pixels extracted from the basic field has an edge or not;

determining in which state, stationary or non-stationary, each of the pixels forming together one of the blocks which has been determined in the edge determining step to have an edge is, on the basis of an absolute value of a difference between the pixel and a pixel in the same pixel position in the reference field;

calculating an absolute value of a difference between a pixel having been determined in the stationary/non-stationary-state determining step to be non-stationary and a pixel in each pixel position in the reference field to determine a correlation between such pixels;

calculating an absolute value of a difference between a pixel on which no correlation is found and pixels adjacent to the pixel in the basic field to determine a correlation between the non-correlative pixel and one of the adjacent pixels on the basis of the difference absolute-value thus calculated; and allocating, on each of the pixels, a motion vector determined by the block matching method according to results of the determination made in the edge determining step and stationary/non-stationary-state determining step and in the correlation determining step and peripheral pixel determining step.

In the above motion vector correction circuit and method, it is determined whether each block including a plurality of pixels extracted from the basic field has an edge or not, it is determined in which state, stationary or non-stationary, each of the pixels forming together one of the blocks which has been determined by the edge determining means to have an edge is, an absolute value of a difference is calculated between a pixel having been determined by the stationary/non-stationary-state determining means to be non-stationary and a pixel in each pixel position in the reference field to determine a correlation between such pixels, an absolute value of a difference is calculated between a pixel with which no correlation is found and pixels adjacent to the pixel in the basic field to determine a correlation between the non-correlative pixel and one of the adjacent pixels on the basis of the difference absolute-value thus calculated, and on each of the pixels, there is allocated a motion vector determined by the block matching method according to results of the determination.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

The embodiment of the present invention will be described herebelow with reference to the accompanying drawings.

The motion vector correction apparatus according to the present invention is generally indicated with a reference 1. The motion vector correction apparatus 1 is integrally built in a motion correction system 9 used in a TV receiver of, for example, the PAL (phase alternation by line) type.

Figure 1:
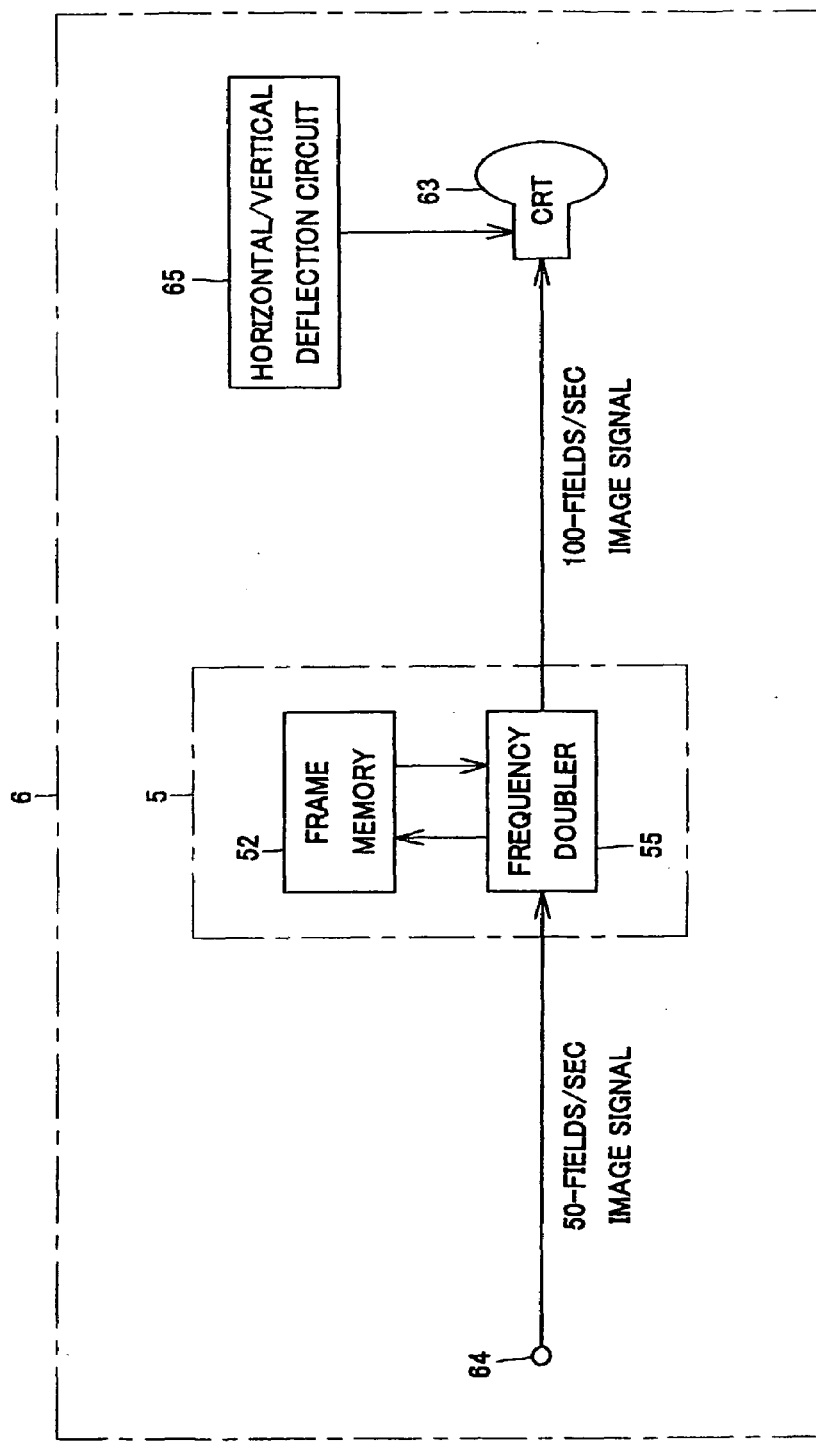
FIG. 1 is a block diagram of a field frequency doubler circuit having the field frequency doubling technique applied therein.
Figure 2B:
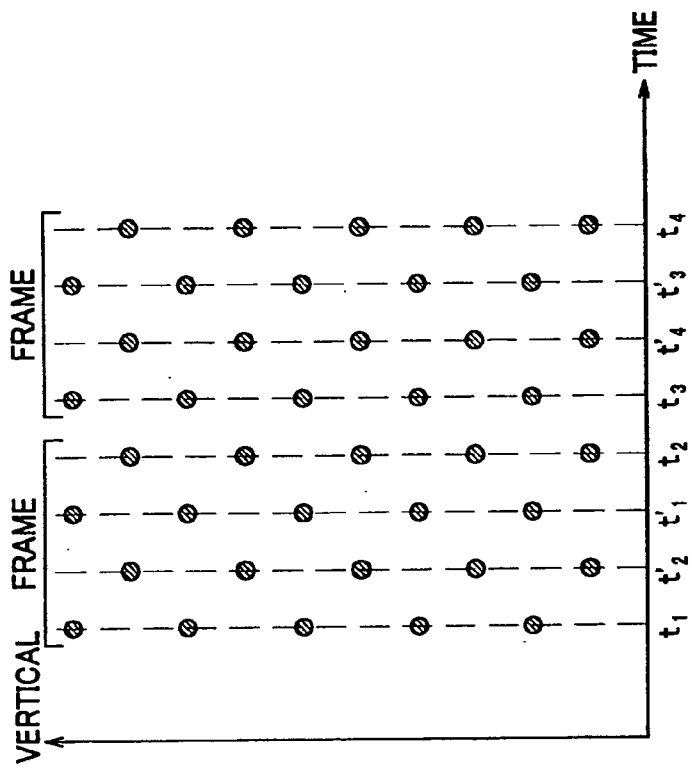
FIGS. 2A an 2B show the relation between each field and pixel position before and after subjected to frequency-doubling conversion.
Figure 2A:
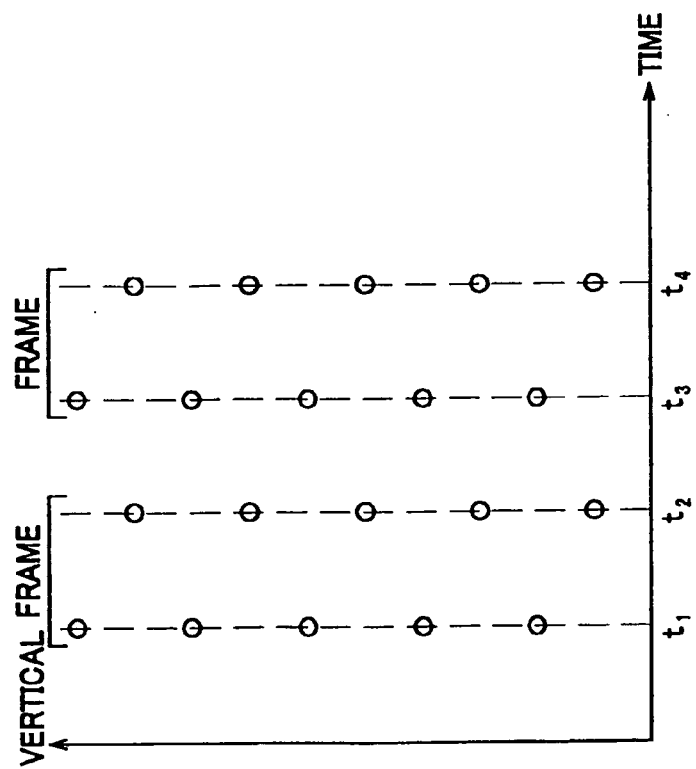
Figure 3B:
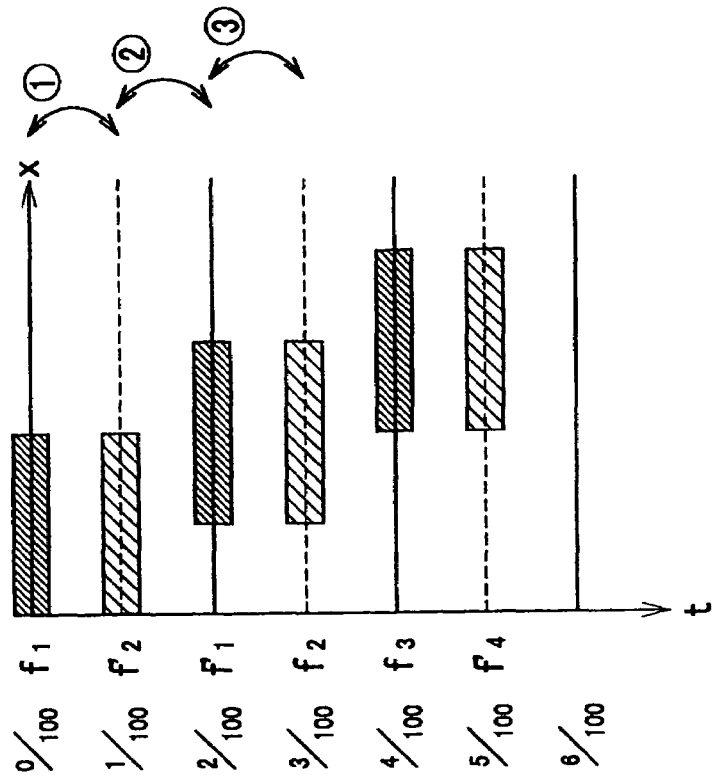
FIGS. 3A and 3B show the relation between each field and image position when an image is shifted horizontally at the time of entering TV signals.
Figure 3A:
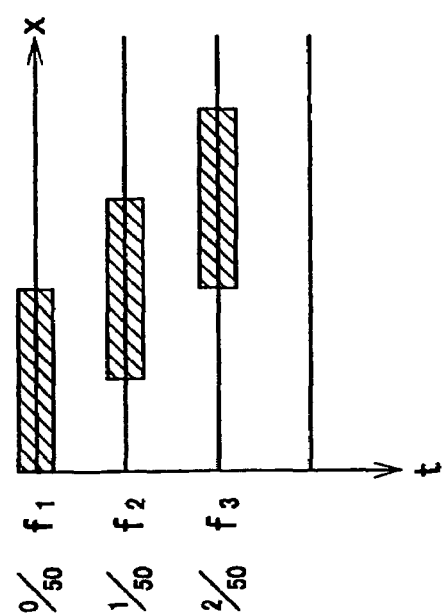
Figure 4:
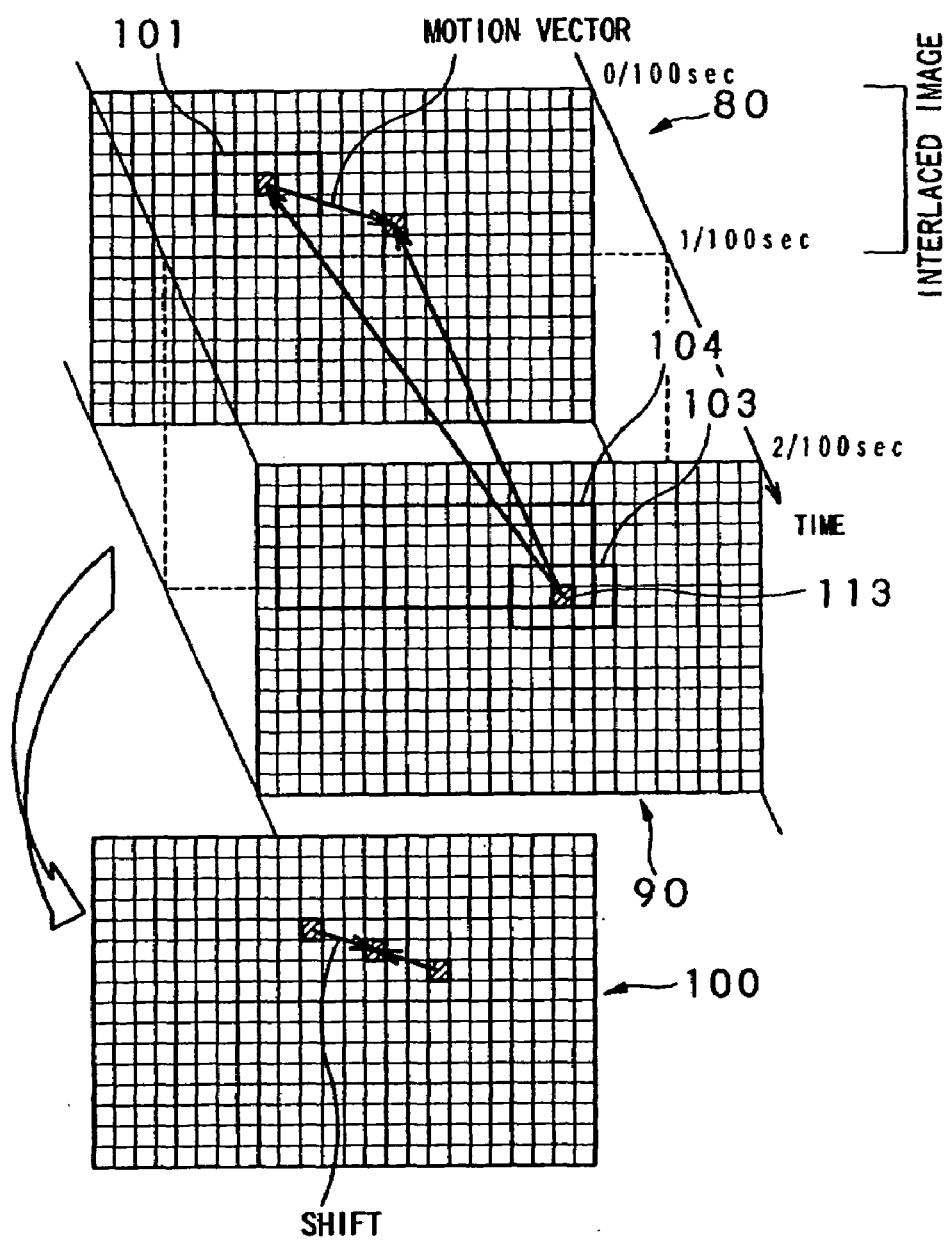
FIG. 4 explains an example of motion vector detection in each block.
Figure 5:
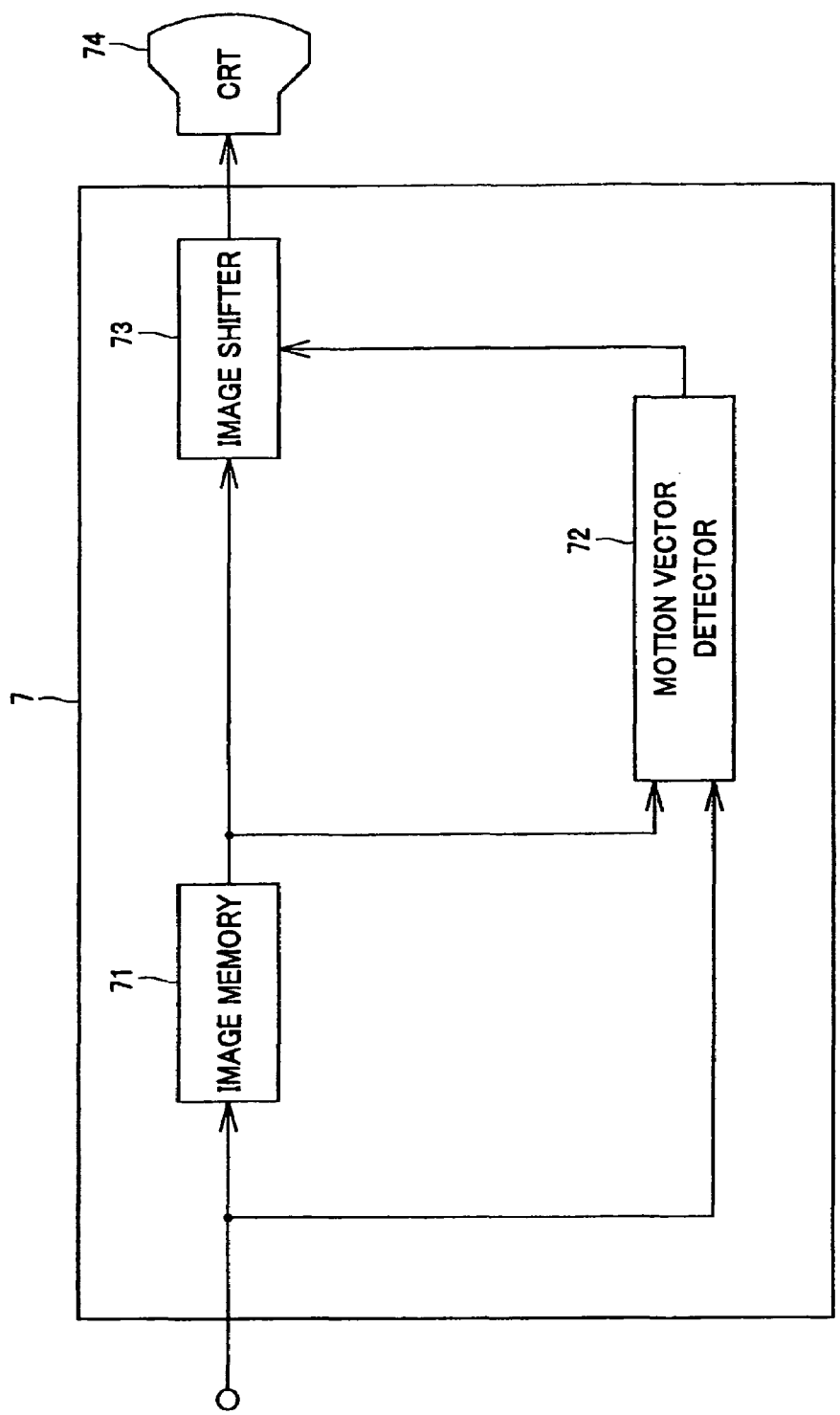
FIG. 5 shows an example of the construction of the motion correction circuit which makes motion correction of a frequency-doubled image signal.
Figure 6B:
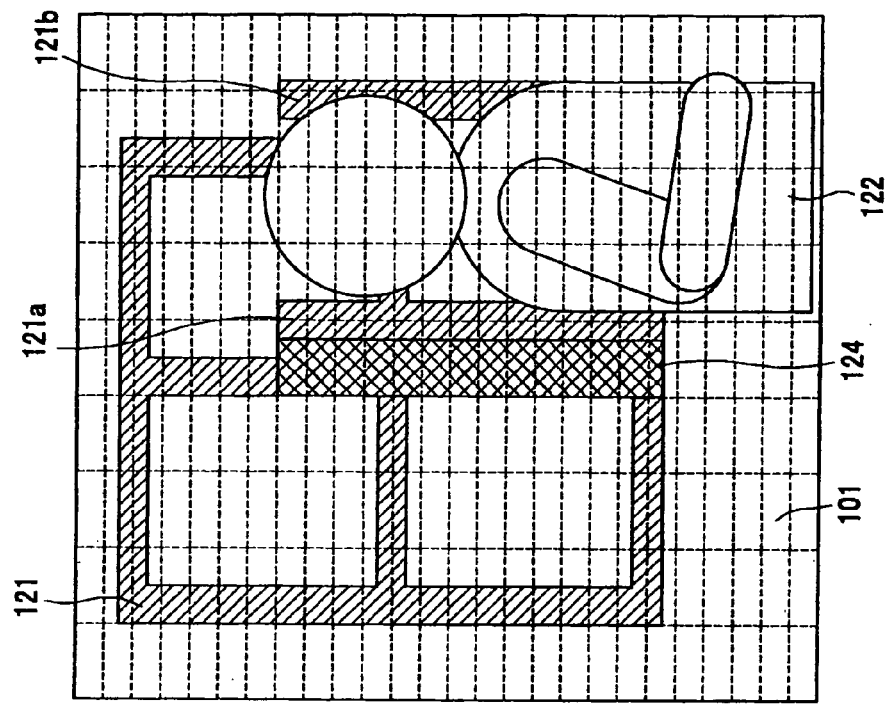
FIGS. 6A and 6B shows an example of a person moving before a stationary window to the right.
Figure 6A:
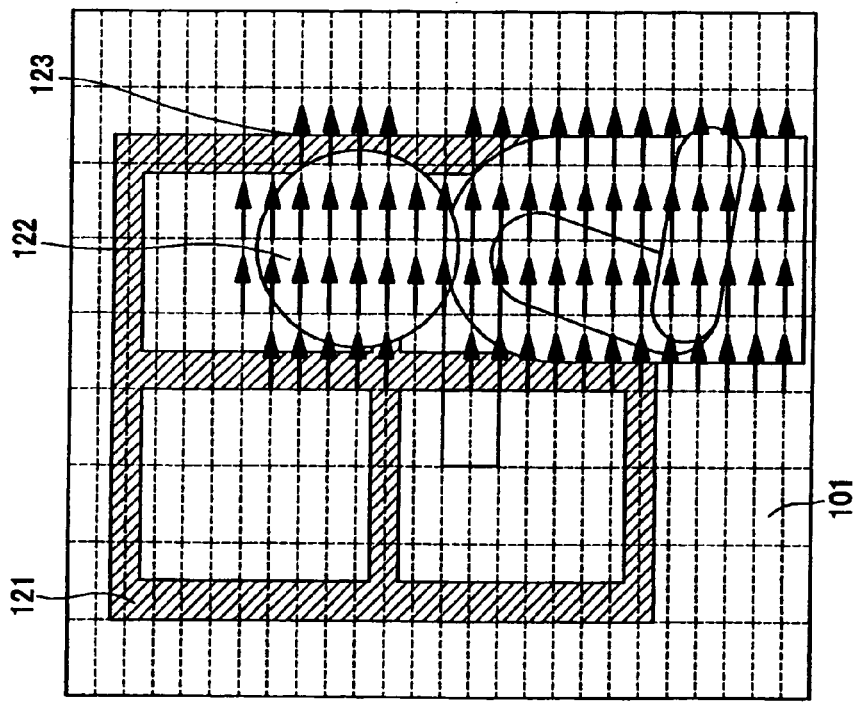
Figure 7:
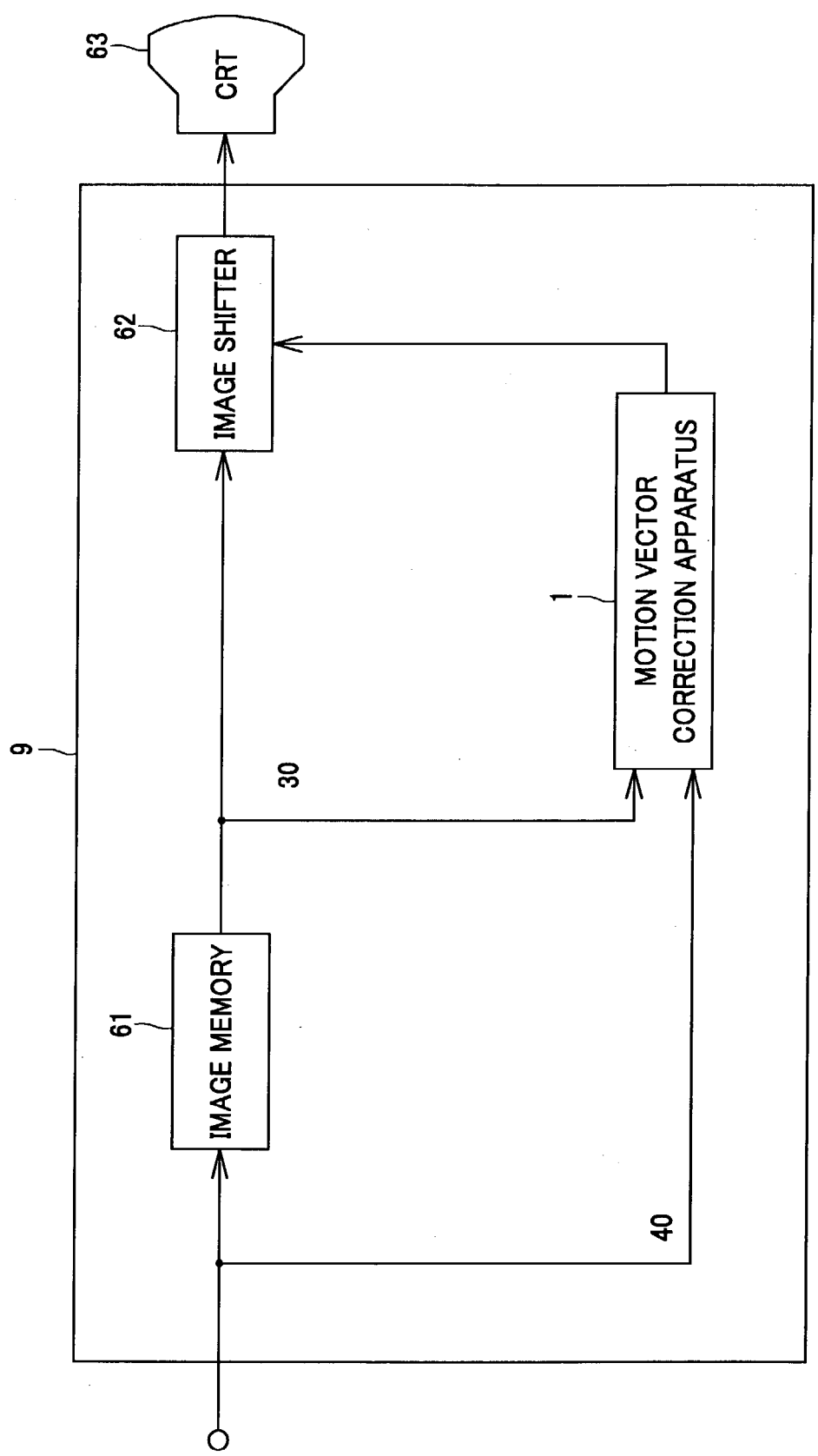
FIG. 7 is a schematic block diagram of a motion correction system.

Referring now to FIG. 7, there is schematically illustrated in the form of a block diagram the motion correction system 9. As shown, the motion correction system 9 includes an image memory 61, image shifter 62 and the motion vector correction apparatus 1 according to the present invention.

The above image memory 61 stores sequentially supplied interlaced image signals in units of a field for one frame. In the following explanation, an image signal output from the image memory 61 will be referred to as "basic field" 30 hereunder, and an image signal input to the image memory 61 will be referred to as "reference field" 40 hereunder. That is to say, the reference field 40 supplied from the image memory 61 has a one-frame delay in relation to the basic field 30 provided by the image memory 61.

At each block or pixel, the motion vector correction apparatus 1 detects a motion vector based on the supplied basic field 30 and reference field 40, and supplies the image shifter 62 with the detected motion vector, namely, information on a magnitude and direction of the shift that are based on the motion vector. The function and composition of the motion vector correction apparatus 1 will be described in detail later.

At each block or pixel, the image shifter 62 receives a motion vector detected by the motion vector correction apparatus 1 or information such as magnitude of the shift and the like that are based on the motion vector. Also, the image shifter 62 shifts each pixel position or each block in the reference field 40 supplied from the image memory 61 in the vector direction within the range of the received motion vector. The image shifter 62 supplies the image signal whose pixel position or block has been shifted in the vector direction to a CRT (cathode ray tube) 63 which will display the image signal supplied from the image shifter 62 on the screen thereof.

Figure 8:
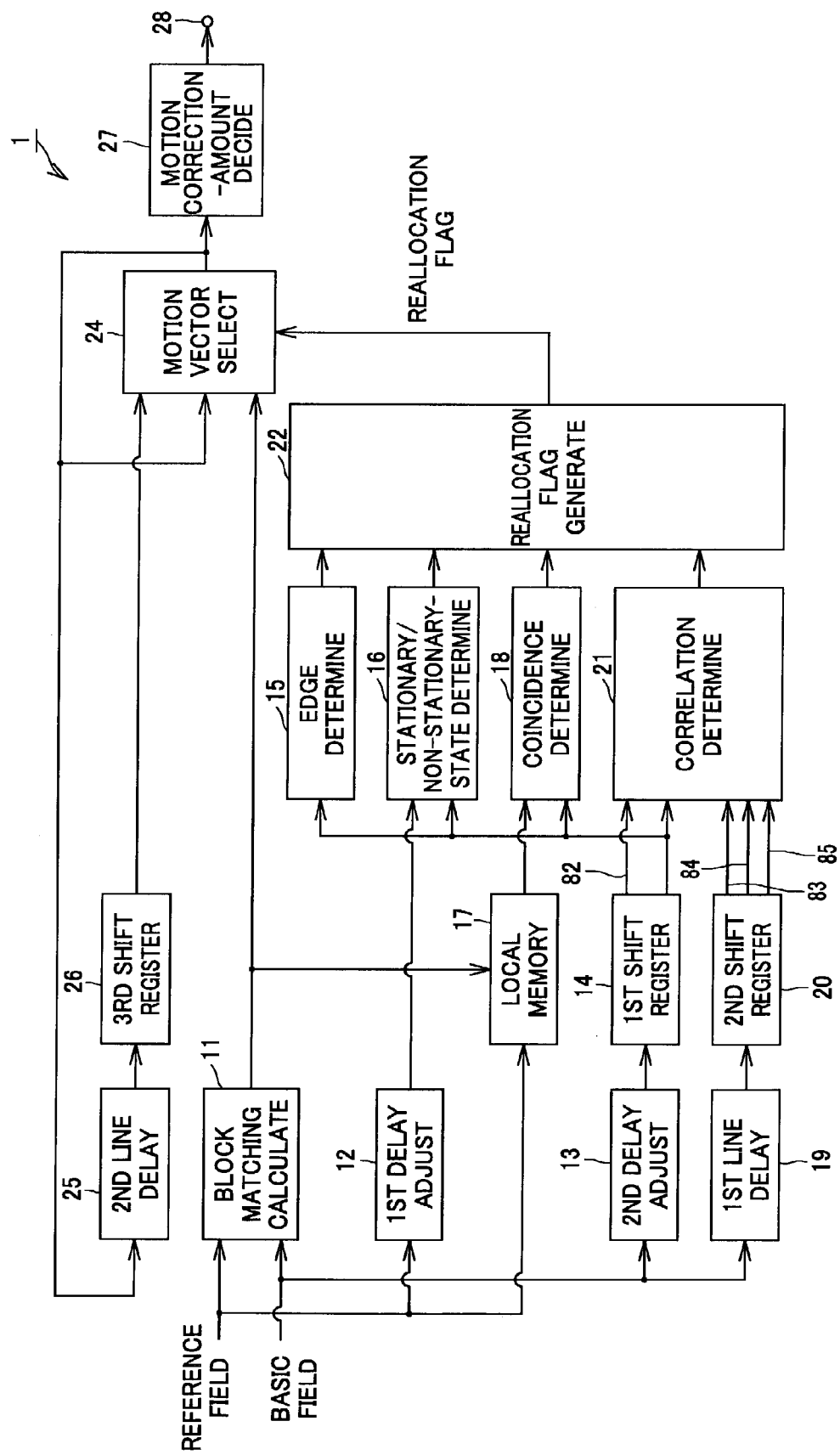
FIG. 8 shows an example of the internal construction of the motion vector correction apparatus according to the present invention.

The motion vector correction apparatus 1 according to the present invention is constructed as will be described below:

As shown in FIG. 8, the motion vector correction apparatus 1 includes a block matching calculator 11, first delay adjuster 12, second delay adjuster 13, first shift register 14, edge determination block 15, stationary/non-stationary-state determination block 16, local memory 17, coincidence determination block 18, first line delay block 19, second shift register 20, correlation determination block 21, reallocation flag generator 22, motion vector selector 24, second line delay block 25, third shift register 26 and a motion correction-amount decision block 27.

Figure 9:
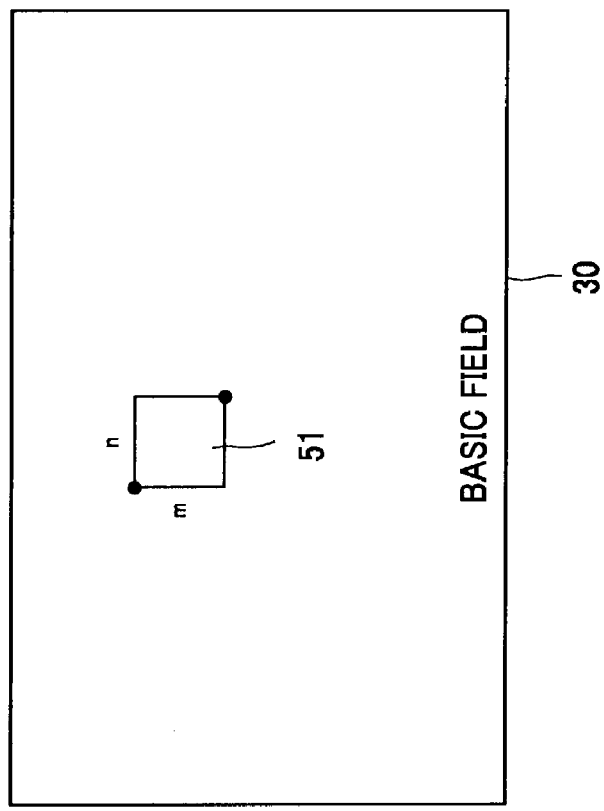
FIG. 9 explains the block matching method technique and extended search range.
Figure 9:
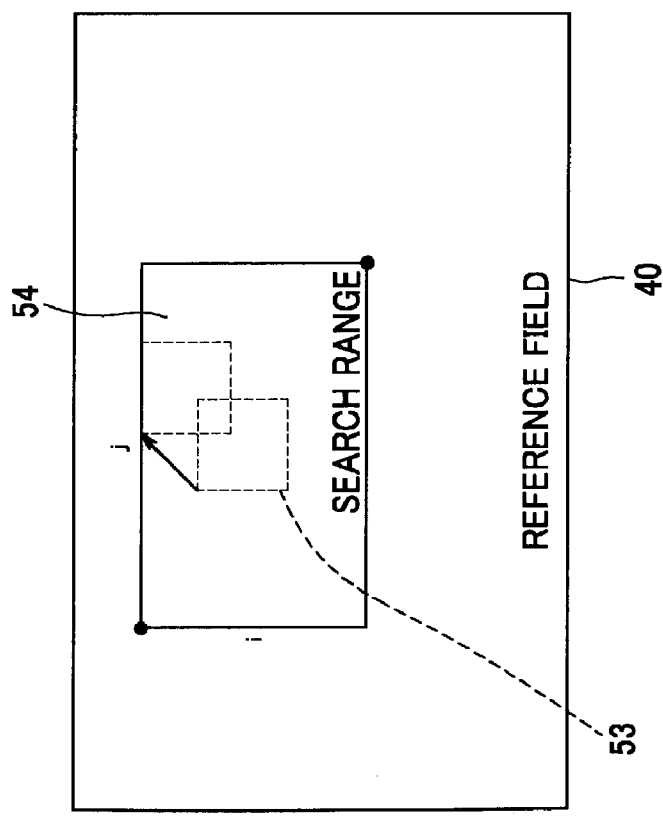

The block matching calculator 11 detects a motion vector by the block matching method on the basis of the supplied basic field 30 and reference field 40 as shown in FIG. 9. The block matching calculator 11 also detects a block given by an m×n pixel size and having a closest correlation with a basic block 51 in the basic field 30 from a search block 53 moved within a search range 54 in the reference field 40. A deviation in position between the detected search block 53 and basic block 51 (direction and magnitude of the motion) is taken as a motion vector. It should be noted that the pixel size of this search range 54 is given by i×j.

Note that to determine the above correlation, the block matching calculator 11 calculates a difference of each pixel value in the search block 53 from a pixel value corresponding to the basic block 51 to determine an assessment value indicated by the difference, for example, a difference absolute-value sum. Next, the block matching calculator 11 repeats the above determination with all the search blocks 53 and determines a smallest one of the assessment value sums. Next, the block matching calculator 11 repeats the above operations for all the search blocks 53 to determine a smallest one of the assessment value sums, that is, difference absolute-value sums. Further, the block matching calculator 11 takes a search block 53 that provides the smallest difference absolute-value sum as having the closest correlation with the basic block 51, and also takes, as a motion vector, a vector identifiable between a pixel at the origin of such a block and a one at the origin of the basic block 51. The block matching calculator 11 supplies the detected motion vector to the local memory 17 and motion vector selector 24.

The first delay adjuster 12 delays the supplied image signal of the reference field 40 a time taken for calculation by the block matching calculator 11 for example, and supplies the signal thus delayed to the stationary/non-stationary-state determination block 16. The second delay adjuster 13 delays the supplied image signal of the basic field 30 a time taken for calculation by the block matching calculator 11 for example, and supplies the signal thus delayed to the first shift register 14. Say, the first and second delay adjusters 12 and 13 work as a so-called delay element.

Figure 10:
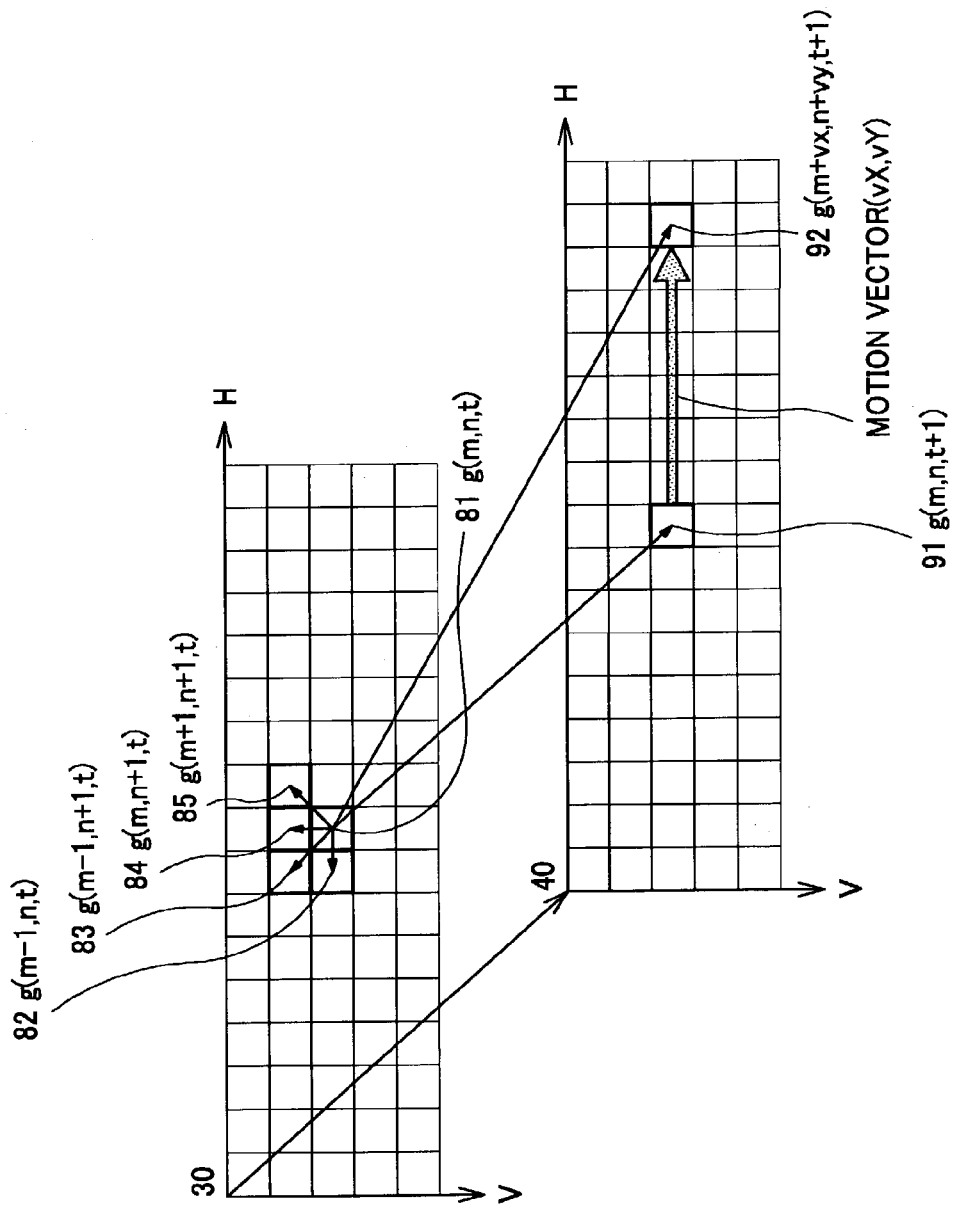
FIG. 10 explains the positional relation of a pixel of interest with pixels adjacent to the pixel of interest.

The first shift register 14 is supplied with the image signal of the basic field 30 from the second delay adjuster 13. The first shift register 14 reads the pixel signal level of each pixel (will be referred to as "pixel value" or "value" wherever appropriate hereinafter) from the supplied image signal of the basic field 30, and supplies it to the edge determination block 15, stationary/non-stationary-state determination block 16, coincidence determination block 18 and correlation determination block 21. A pixel read by the first shift register 14 is called "pixel of interest" 81. Also, the first shift register 14 will read the value of a pixel to the left of the pixel 81 and supplies it to the correlation determination block 21. In the following description, a pixel to the left of the pixel of interest 81 will be called "left-adjacent pixel" 82. FIG. 10 shows the positional relation between the pixel of interest 81 and the left-adjacent pixel 82 located to the left of the pixel of interest 81.

The edge determination block 15 is supplied with the value of the pixel of interest 81 in the basic field 30 from the first shift register 14. The edge determination block 15 judges, on the basis of the value of the supplied pixel of interest 81, whether each basic block 51 in the basic block 30 has an edge or not. This judgment of whether each basic block 51 has an edge can be done by identifying the value of the pixel of interest 81 under the assumption that the pixel of interest 81 is composed of pixels forming together the basic block 51. The edge determination block 15 generates an edge assessment value "1" for a basic block 51 having been determined have an edge, and supplies the value to the reallocation flag generator 22. On the contrary, the edge determination block 15 generates an edge assessment value "0" for a basic block 51 having not been determined to have an edge, and supplies the value to the reallocation flag generator 22. It should be noted that the edge determination block 15 may do this edge determining by comparison of the pixel of interest 81 with a predetermined threshold.

The stationary/non-stationary-state determination block 16 is supplied with an image signal of the reference field 40 from the first delay adjuster 12 and with the value of the pixel of interest 81 in the basic field 30 from the first shift register 14. The stationary/non-stationary-state determination block 16 compares the value of the pixel of interest 81 in the basic field 30 with the value of a pixel in the same pixel position 91 in the reference field 40 as shown in FIG. 10 and judges if the pixel of interest 81 is stationary (will be referred to as "stationary state" hereunder) or moves (will be referred to as "non-stationary state" hereunder) until the reference field 40 is reached. In case that the pixel of interest 81 is in the stationary state, the stationary/non-stationary-state determination block 16 will generate a stationary/non-stationary-state assessment value "1" and supply it to the reallocation flag generator 22. In case that the pixel of interest 81 is in the non-stationary state, the stationary/non-stationary-state determination block 16 will generate a stationary/non-stationary-state assessment value "0" and supply it to the reallocation flag generator 22. It should be noted that the stationary/non-stationary-state determination block 16 may do this determination by comparison of an absolute value of a difference calculated between the value of the pixel of interest 81 and that of the pixel in the pixel position 91 with a predetermined threshold, for example.

The local memory 17 is sequentially supplied with the image signal of the reference field 40 and also with motion vectors from the block matching calculator 11. The local memory 17 identifies a pixel position 92 in the reference field 40, shifted over the motion vector from the pixel of interest 81 as shown in FIG. 10. It should be noted that the pixel position 92 will be a position shifted over the motion vector from the above pixel position 91 in the reference field 40. The local memory 17 reads the value of a pixel in the pixel position 92 from each of the reference fields 40 sequentially written on the basis of the motion vector, and supplies it to the coincidence determination block 18.

The coincidence determination block 18 is supplied with the value of the pixel of interest 81 in the basic field 30 from the first shift register 14, and also with the value of the pixel in the pixel position 92 in the reference field 40 from the local memory 17. The coincidence determination block 18 compares the value of the pixel of interest 81 with the value of the pixel in the pixel position 92 to judge whether the pixel of interest 81 has shifted over the motion vector. In case that the value of the pixel of interest 81 is generally correlated with the value of the pixel in the pixel position 92, the coincidence determination block 18 will determine that the pixel of interest 81 has shifted over the motion vector, and output a coincidence assessment value "1" to the reallocation flag generator 22. In case that the value of the pixel of interest 81 is not correlated with the value of the pixel in the pixel position 92, the coincidence determination block 18 will determine that the pixel of interest 81 has not shifted over the motion vector, and output a coincidence assessment value "0" to the reallocation flag generator 22. It should be noted that the coincidence determination block 18 may do this determination by comparison of an absolute value of a difference calculated between the value of the pixel of interest 81 and that of the pixel in the pixel position 92 with a predetermined threshold, for example.

The first line delay block 19 delays the supplied image signal of the basic field 30 by one line, for example, and supplies the signal to the second shift register 20. Owing to the one-line delay made by the first line delay block 19 of the image signal of the basic field 30, the value of a pixel in a pixel position that is one line above the pixel of interest 81 for example can be sent to the second shift register 20.

The second shift register 20 is supplied with the image signal of the basic field 30 from the first line delay block 19. It reads the value of each pixel from the supplied image signal of the basic field 30, and supplies the pixel value to the correlation determination block 21. Say, the second shift register 20 will be sequentially supplied with pixels in pixel positions delayed one line in relation to a line where the pixel of interest 81 lies. Thus, in case that the first shift register 14 is reading the value of the pixel of interest 81, the values of pixels in pixel positions that are one line above the pixel of interest 81 can also be read. In the following description, of the pixels one line above the pixel of interest 81, a one to the upper left of the pixel of interest 81 will be called "upper left-adjacent pixel" 83, a one above the pixel of interest 81 be called "upper-adjacent pixel" 84, and a one to the upper right of the pixel of interest 81 be called "upper right-adjacent pixel" 85, as shown in FIG. 10. The second shift register 20 reads the value of these upper left-adjacent pixel 83, upper-adjacent pixel 84 and upper right-adjacent pixel 85, respectively, and supplies the values to the correlation determination block 21.

The correlation determination block 21 is supplied with the values of the pixel of interest 81 and left-adjacent pixel 82 from the first shift register 14, and also with the values of the upper left-adjacent pixel 83, upper-adjacent pixel 84 and upper right-adjacent pixel 85 from the second shift register 20. The correlation determination block 21 compares the value of the pixel of interest 81 with that of the left-adjacent pixel 82, upper left-adjacent pixel 83, upper-adjacent pixel 84 or upper right-adjacent pixel 85 (pixels adjacent to the pixel of interest 81 and including the pixels 82, 83, 84 and 85 will generically be referred to as "adjacent pixel" 8 hereunder) to determine a correlation between the pixel of interest 81 and adjacent pixel 8 on the basis of an absolute value of a difference determined between the values of the pixel of interest 81 and adjacent pixel 8. The correlation determination block 21 finds an adjacent pixel 8 most correlative with the pixel of interest 81 for example, generates a correlation assessment value, and sends it to the reallocation flag generator 22. It is assumed that a correlation assessment value is "1" for a correlation found with the upper left-adjacent pixel 83, "2" for a correlation found with the upper-adjacent pixel 84, "3" for a correlation found with the upper right-adjacent pixel 85, and "4" for a correlation found with the left-adjacent pixel 82. It should be noted that the correlation determination block 21 may do this determination by comparison of an absolute value of a difference calculated between the value of the pixel of interest 81 and that of the adjacent pixel 8 with a predetermined threshold, for example.

The reallocation flag generator 22 is supplied with an edge assessment value from the edge determination block 15, a stationary/non-stationary-state assessment value from the stationary/non-stationary-state determination block 16, a coincidence assessment value from the coincidence determination block 18, and also with a correlation assessment value from the coincidence determination block 21. The reallocation flag generator 22 generates a reallocation flag on each basic block 51 or pixel on the basis of the supplied assessment values and following a procedure which will be described in detail later. The reallocation flag generator 22 sends the generated reallocation flag to the motion vector selector 24.

The motion vector selector 24 is supplied with a motion vector from the block matching calculator 11, and also with a reallocation flag from the reallocation flag generator 22. Further, the motion vector selector 24 is supplied with a motion vector of the upper left-adjacent pixel 83, upper-adjacent pixel 84 or upper right-adjacent pixel 85 from the third shift register 26 which will be described in detail later, and also with the left-adjacent pixel 82 from itself, the motion vector selector 24 will allocate an optimum one of the supplied motion vectors to the pixel of interest 81 according to the supplied reallocation flag, and output the pixel of interest 81 to which the motion vector has thus been allocated.

The output motion vector of the pixel of interest 81 from the motion vector selector 24 is sent to the motion correction-amount decision block 27, and also fed back to the motion vector selector 24. Since the pixel of interest 81 is sequentially shifted from left to right (in the direction H in FIG. 10) for identification, the output motion vector of the pixel of interest 81 is a one for the pixel 82 left-adjacent to the pixel of interest 81 identified next to the pixel of interest 81 in consideration.

Also, the output motion vector of the pixel of interest 81 from the motion vector selector 24 is sent to the second line delay block 25. This second line delay block 25 delays the motion vector of the pixel of interest 81 to be sent by one line to the third shift register 26. Because of this one-line delay made by the second line delay block 25, it is possible to detect the motion vector of a pixel that is one line above the pixel of interest 81.

The third shift register 26 is supplied with the motion vector of the pixel that is one line above the pixel of interest 81 from the second line delay block 25. The third shift register 26 will extract the motion vectors of the upper left-adjacent pixel 83, upper-adjacent pixel 84 and upper right-adjacent pixel 85 from the supplied motion vector of the one-line above pixel. Also, the third shift register 26 outputs the motion vectors of the upper left-adjacent pixel 83, upper-adjacent pixel 84 and upper right-adjacent pixel 85 to the motion vector selector 24.

The motion correction-amount decision block 27 is supplied with a motion vector allocated on each of the pixels from the motion vector selector 24. The motion correction-amount decision block 27 converts the motion vector into an appropriate shift amount for a motion on the basis of the motion vector allocated on each of the pixels, and outputs the shift amount to an output terminal 28.

Next, the motion vector correction apparatus 1 according to the present invention functions as will be described with reference to the flow chart in FIG. 11.

Figure 11:
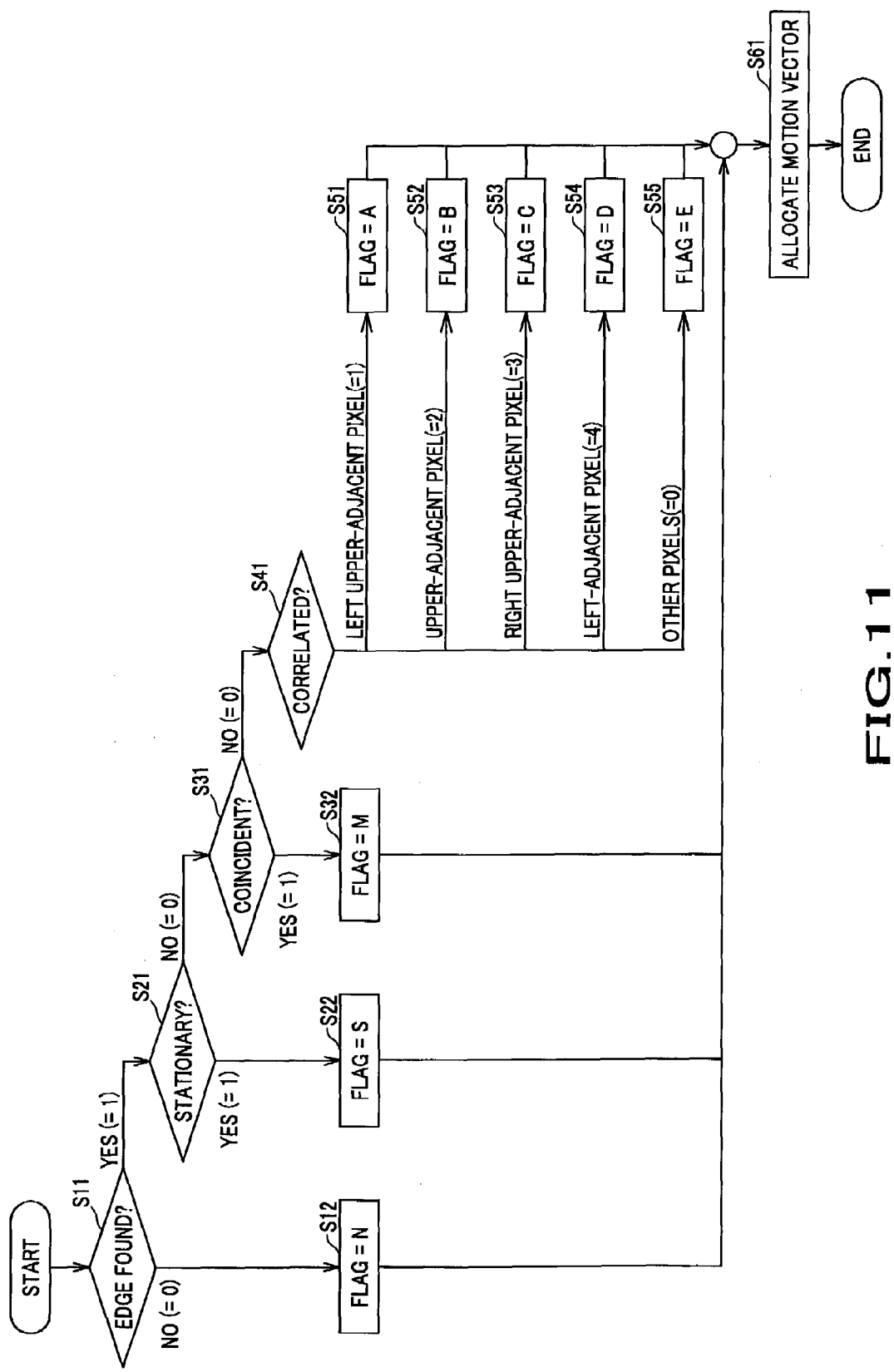
FIG. 11 shows a flow of operations made in the motion vector correcting method according to the present invention.
Figure 12A:
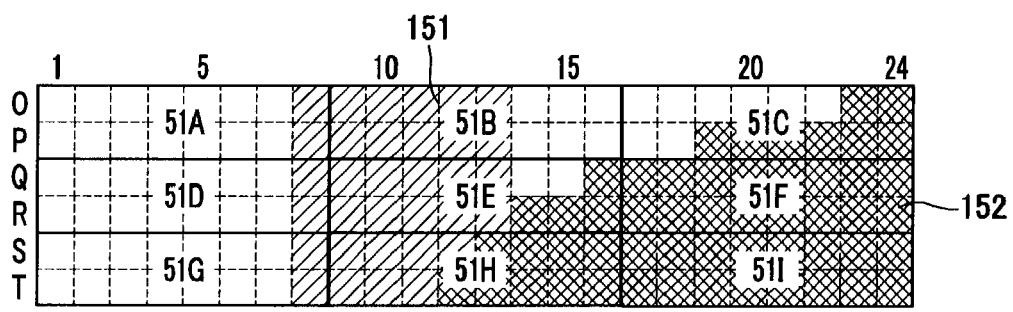
FIGS. 12A and 12B show an example of the motion vector correction for a scene in which a person moving before a stationary window to the right.
Figure 12B:
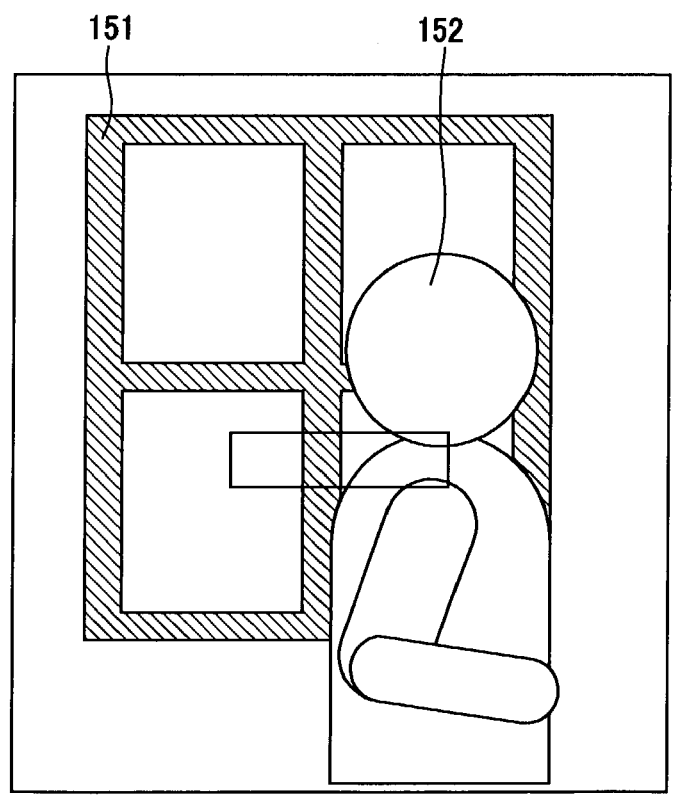

FIG. 12A shows an image whose motion vector is to be corrected for each of the pixels in the procedure shown in FIG. 11. FIG. 12A shows a part, defined by a thick frame, in an enlarged scale, of a scene in which a person 152 moves to the right before a window 151 as shown in FIG. 12B. In the partial scene, the basic block 51 is gridironed in the basic field 30. In the example shown in FIG. 12A, the basic block 51 including basic blocks 51A to 51I in this order from the left is composed of eight pixels by two lines, and positions of the pixels forming together each basic block 51 are represented by lines O to T and rows 1 to 24 in this order from the upper-left pixel position.

Note that in FIG. 12A, the window 151 is depicted in the rows 8 to 13 and the person 152 is depicted to the upper right from the pixel position defined by the line T and row 12. The person 152 moves over seven pixels to the left in the reference field 40. Say, the motion vector determined for the person 152 has a magnitude of seven pixels and the vector direction is rightward.

In the motion vector correction apparatus 1, the edge determination block 15 judges in step S11 in FIG. 11 whether each of the basic blocks 51A to 51I has an edge or not. This judgment is done by detecting a pixel of interest 81 for each of the basic blocks 51 and assessing the pixel value of the detected pixel of interest 81. Since the basic blocks 51F and 51I of the basic blocks 51A to 51I are composed of the person 152 alone, the edge determination block 15 will not be able to detect any edge of these basic blocks 51F and 51I. Therefore, all the pixels of interest 81 included in the basic block 51 have the same value. Thus, the edge determination block 15 will go to step S12 with generation of an edge assessment value "0" for the basic blocks 51F and 51I.

On the contrary, since the edge determination block 15 determines in step S11, that the basic blocks 51 other than the above basic blocks 51F and 51I have an edge and the pixels of interest 81 forming together the basic blocks 51 have values different from each other, it will go to step S21 with generation of an edge assessment value "1".

Figure 13:
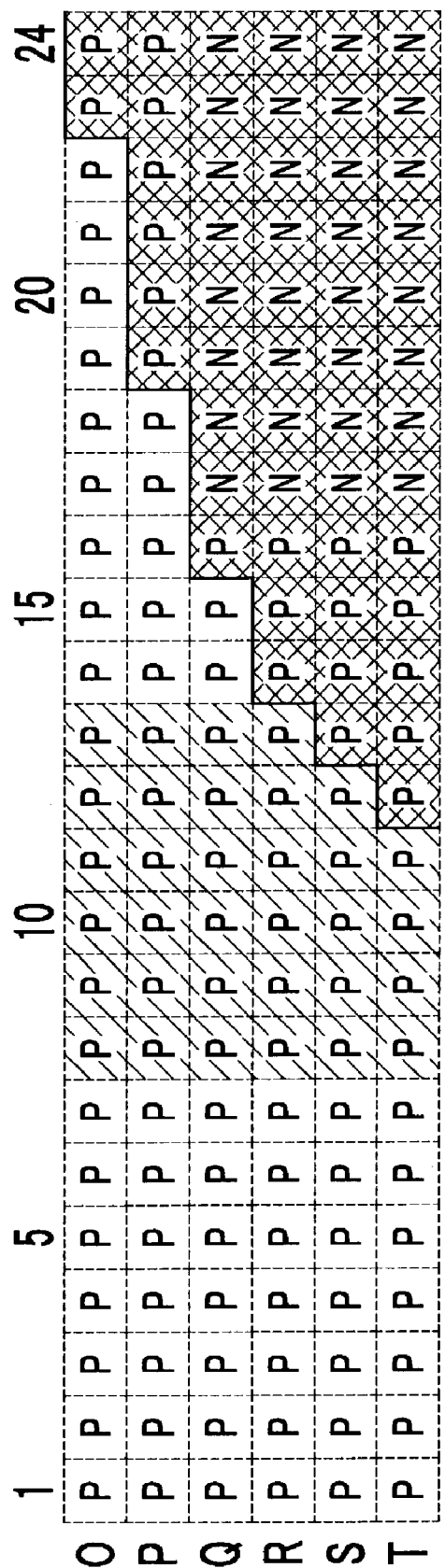
FIG. 13 explains a reallocation flag allocated on every basic blocks according to an edge criterion.

In step S12, the reallocation flag generator 22 generates a reallocation flag on each basic block 51 according to the edge assessment value sent from the edge determination block 15. In this case, the reallocation flag generator 22 allocates a reallocation flag "N" on the basic blocks 51F and 51I for which the edge assessment value "0" is generated, as shown in FIG. 13. Also, the reallocation flag generator 22 allocates a reallocation flag "P" on the basic blocks 51 for which the edge assessment value "1" is generated, as shown in FIG. 13.

That is, first in steps S11 to S12, the motion vector correction apparatus 1 according to the present invention can determine a motion vector as usual by detecting a motion vector on each block and allocating different reallocation flags to motion vectors of the basic blocks having no edge. Thus, for the blocks having no edge, in other words, for uni-colored blocks, the motion vector has not to be corrected for each of the pixels, which enables to reduce the operational amount of the apparatus.

Note that for the basic blocks 51 on which the reallocation flag "P" is allocated as shown in FIG. 13, a motion vector is allocated on each of the pixels in step S21 and subsequent steps.

In step S21, the stationary/non-stationary-state determination block 16 judges in which state, stationary or non-stationary, each of the pixels in the basic blocks 51 on which the reallocation flag "P" is allocated is. On the assumption that the pixel value of the pixel of interest 81 in the basic field 30 is g(m, n, t) and the pixel value of a pixel in the pixel position 91 in the reference field 40 is g(m, n, t+1) as shown in FIG. 10, the stationary/non-stationary-state determination block 16 will make a comparison between a calculated difference absolute-value and a threshold, as given by the following expression (21) for example:

$$|g(m, n, t) - g(m, n, t+1)| < \text{Threshold } \alpha \quad (21)$$

When the expression (21) is satisfied, namely, when the terms g(m, n, t) and g(m, n, t+1) are nearly equal to each other, it is suggested that the pixel of interest 81 remains stationary until the reference field 40 is reached, and the stationary/non-stationary-state determination block 16 will go to step S22 with generation of a stationary/non-stationary-state assessment value "1". In this case, since the pixels forming together the window 151 are stationary, the stationary/non-stationary-state assessment value "1" is generated for the pixels.

On the contrary, when the expression (21) is not satisfied, in other words, when the terms g(m, n, t) and g(m, n, t+1) are not correlated with each other, it is suggested that the pixel of interest 81 is moved until the reference field 40 is reached, and the stationary/non-stationary-state determination block 16 will go to step S31 with generation of a stationary/non-stationary-state assessment value "0".

In step S22, the reallocation flag generator 22 allocates a reallocation flag on each pixel of interest 81 on the basis of a stationary/non-stationary-state assessment value sent from the stationary/non-stationary-state determination block 16. In this case, a reallocation flag "S" is allocated on each of the pixels forming together the window 151 for example, as shown in FIG. 14.

Figure 14:
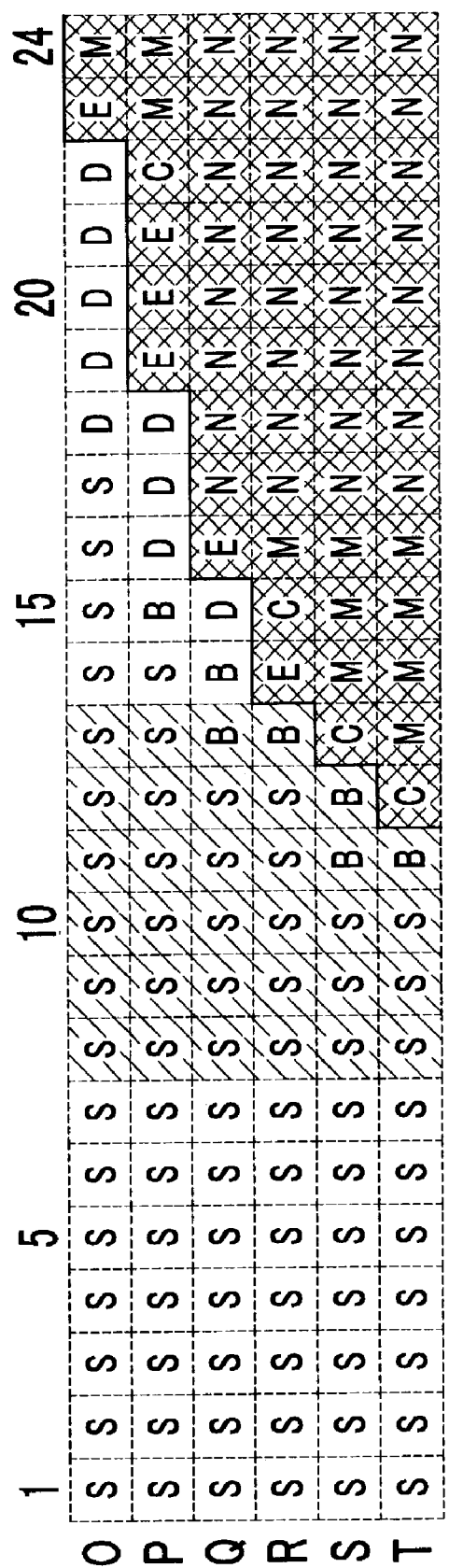
FIG. 14 explains the reallocation flag allocated on each of the pixels according to each edge criterion.

As shown in FIG. 14, the pixel of interest 81 causing the stationary/non-stationary-state determination block 16 to go to step S31, namely, the pixel of interest 81 on which the stationary/non-stationary-state assessment value "0" has been allocated in step S21, is a pixel forming the person 152 and included in the basic block 51 having an edge or a pixel forming other than the person 152 and which does not strictly satisfy the expression (21) because it is located near the person 152. In step S31, of such pixel of interest 81, ones are identified which evidently form together the person 152.

In step S31, the coincidence determination block 18 will judge whether the pixel of interest 81 has shifted over the motion vector by making a comparison between the pixel value of the pixel of interest 81 for which the stationary/non-stationary-state assessment value "0" has been generated and that of a pixel in the pixel position 92 for the pixel of interest 81. Thereby, the pixel of interest 81 forming the person 152 can be identified.

On the assumption that the pixel value of the pixel in the pixel position 92 shifted over a motion vector (Vx, Vy) from the pixel position 91 in the reference field 40 is g(m+Vx, n+Vy, t+1) as shown in FIG. 10, the coincidence determination block 18 will make a comparison between the calculated difference absolute-value and threshold as given by the following expression (22) for example:

$$|g(m, n, t) - g(m+Vx, n+Vy, t+1)| < \text{Threshold } \beta \quad (22)$$

When the expression (22) is satisfied, namely, when the terms g(m, n, t) and g(m+Vx, n+Vy, t+1) are nearly equal to each other, it is suggested that the pixel of interest 81 has shifted over the motion vector until the reference field 40 is reached, and the coincidence determination block 18 will go to step S32 with generation of a coincidence assessment value "1". In this case, since the pixels forming together the person 152 move over the motion vector, the coincidence assessment value "1" is generated for the pixels. On the contrary, when the expression (22) is not satisfied, in other words, when the terms g(m, n, t) and g(m+Vx, n+Vy, t+1)

are not correlated with each other, it is suggested that the pixel of interest 81 is moved until the reference field 40 is reached, and the coincidence determination block 18 will go to step S41 with generation of a coincidence assessment value "0".

In step S32, the reallocation flag generator 22 allocates a reallocation flag on each pixel of interest 81 on the basis of a coincidence assessment value sent from the coincidence determination block 18. In this case, a reallocation flag "M" is allocated to each of the pixels forming together the person 152 for example, as shown in FIG. 14.

The pixel of interest 81 causing the coincidence determination block 18 to go to step S41, namely, the pixel of interest 81 to which the coincidence assessment value "0" has been allocated in step S31, is a pixel forming the person 152 or a pixel forming other than the person 152 and which does not strictly satisfy the expression (22) because it is located near the person 152. In step S41, such pixel of interest 81 between the stationary image and non-stationary one is adapted to an adjacent pixel 8 showing a highest correlation.

On the assumption that the pixel value of the left-adjacent pixel 82 is g(m−1, n, t) and that of the left upper-adjacent pixel 83 is g(m−1, n+1, t) as shown in FIG. 10, that of the upper-adjacent pixel 84 is g(m, n+1, t) and that of the right upper-adjacent pixel 85 is g(m+1, n+1, t) as shown in FIG. 10, the correlation determination 21 makes first a comparison between the pixel value g(m, n, t) of the pixel of interest 81 and the pixel value g(m−1, n+1, t) of the left upper-adjacent pixel 83 on the basis of the following expression (23) for example:

$$|g(m, n, t)-g(m-1 n+1, t)| < \text{Threshold } \gamma \quad (23)$$

When the expression (23) is satisfied, namely, when the terms g(m, n, t) and g(m−1, n+1, t) are nearly equal to each other, it is suggested that the pixel of interest 81 is correlated with the left upper-adjacent pixel 83. In this case, the correlation determination block 21 will go to step S51 with generation of a correlation assessment value "1".

On the contrary, when the expression (23) is not satisfied, it is suggested that the pixel of interest 81 is not correlated with the left upper-adjacent pixel 83. In this case, the correlation determination block 21 will make a comparison between the pixel value g(m, n, t) of the pixel of interest 81 and the pixel value g(m, n+1, t) of the upper-adjacent pixel 84 on the basis of the following expression (24) for example:

$$|g(m, n, t)-g(m, n+1, t)| < \text{Threshold } \gamma \quad (24)$$

When the expression (24) is satisfied, namely, when the terms g(m, n, t) and g(m, n+1, t) are nearly equal to each other, it is suggested that the pixel of interest 81 is correlated with the upper-adjacent pixel 84. In this case, the correlation determination block 21 will go to step S52 with generation of a correlation assessment value "2".

On the contrary, when the expression (24) is not satisfied, it is suggested that the pixel of interest 81 is not correlated with the upper-adjacent pixel 84. In this case, the correlation determination block 21 will make a comparison between the pixel value g(m, n, t) of the pixel of interest 81 and the pixel value g(m+1, n+1, t) of the right upper-adjacent pixel 85 on the basis of the following expression (25) for example:

$$|g(m, n, t)-g(m+1, n+1, t)| < \text{Threshold } \gamma \quad (25)$$

When the expression (25) is satisfied, namely, when the terms g(m, n, t) and g(m+1, n+1, t) are nearly equal to each other, it is suggested that the pixel of interest 81 is correlated with the right upper-adjacent pixel 85. In this case, the correlation determination block 21 will go to step S53 with generation of a correlation assessment value "3".

On the contrary, when the expression (25) is not satisfied, it is suggested that the pixel of interest 81 is not correlated with the right upper-adjacent pixel 85. In this case, the correlation determination block 21 will make a comparison between the pixel value g(m, n, t) of the pixel of interest 81 and the pixel value g(m−1, n, t) of the let adjacent pixel 82 on the basis of the following expression (26) for example:

$$|g(m, n, t)-g(m-1, n, t)| < \text{Threshold } \gamma \quad (26)$$

When the expression (26) is satisfied, namely, when the terms g(m, n, t) and g(m−1, n, t) are nearly equal to each other, it is suggested that the pixel of interest 81 is correlated with the left-adjacent pixel 82. In this case, the correlation determination block 21 will go to step S54 with generation of a correlation assessment value "4".

On the contrary, when the expression (26) is not satisfied, it is suggested that the pixel of interest 81 is not correlated with the left-adjacent pixel 82. In this case, the correlation determination block 21 will got to step S55 with generation of a correlation assessment value "0".

Namely, in step S41, the correlation determination block 21 makes a comparison of the left upper-adjacent pixel 83, upper-adjacent pixel 84, fight upper adjacent-pixel 85 and left-adjacent pixel 82, in this order, with the pixel of interest 81. In case that each of the difference between the pixels in comparison is smaller than the threshold γ, the correlation determination block 21 will go to steps S51 to S55. In other words, the comparison, for correlation determination, with the pixel of interest 81 is done preferentially starting with the left upper-adjacent pixel 83.

Note that step S41 is not limited to the aforementioned procedure and method but the order of adjacent pixels 8 to be compared in pixel value with the pixels of interest 81 may be changed and also the comparison, for correlation determination, with the pixel of interest 81 may be done preferentially starting with the upper-adjacent pixel 84, right upper-adjacent pixel 85 or left-adjacent pixel 82 as well as starting with the left upper-adjacent pixel 83.

Also, for the correlation determination in step S41, the pixel of interest 81 is compared with the four pixels including the left upper-adjacent pixel 83, upper-adjacent pixel 84, right upper-adjacent pixel 85 and left-adjacent pixel 82 of the adjacent pixels 8. However, the present invention is not limited to this method, but for the same purpose, the pixel of interest 81 may be compared with all adjacent pixels such as pixels right-adjacent thereto, lower-adjacent thereto, etc. Also, in step S41, for the correlation determination, the pixel of interest 81 may be compared with other than the adjacent pixels 8, such as pixels that are one pixel or two pixels apart from the pixel of interest 81.

Further, for the same purpose in step S41, the pixel of interest 81 may be compared with one of the adjacent pixels 8, whose absolute value of a difference in pixel value from the pixel of interest 81 is minimum. Thereby, it is possible to select an adjacent pixel 8 whose pixel value is nearest to that of the pixel of interest 81 and to adapt that pixel to the surrounding image.

In step S51, the reallocation flag generator 22 generates a reallocation flag "A" on a pixel of interest 81 to which the correlation assessment value "1" has been allocated by the correlation determination block 21.

In step S52, the reallocation flag generator 22 generates a reallocation flag "B" on a pixel of interest 81 to which the correlation assessment value "2" has been allocated by the correlation determination block 21.

In step S53, the reallocation flag generator 22 generates a reallocation flag "C" on a pixel of interest 81 to which the correlation assessment value "3" has been allocated by the correlation determination block 21.

In step S54, the reallocation flag generator 22 generates a reallocation flag "D" on a pixel of interest 81 to which the correlation assessment value "4" has been allocated by the correlation determination block 21.

In step S55, the reallocation flag generator 22 generates a reallocation flag "E" on a pixel of interest 81 to which the correlation assessment value "0" has been allocated by the correlation determination block 21.

In step S51 to S55, a reallocation flag generated on each pixel of interest 81 is allocated to pixels of interest 81 lying between a stationary image such as the window 151 and a non-stationary image such as the person 152 as shown in FIG. 14. For example, a reallocation flag "C" is allocated on a pixel of interest 81 lying at an intersection of the line T and row 12. Say, it is suggested that the pixel at the intersection between the line T and row 12 are highly correlative with a right upper-adjacent pixel at an intersection between the line S and row 13. Also, a reallocation flag "D" is allocated on a pixel of interest 81 lying at an intersection between the line Q and row 15. Say, it is suggested that the pixel at the intersection between the line Q and row 15 is highly correlative with the pixel at a left-adjacent pixel at an intersection between the line Q and row 14. As shown in FIG. 14, after a reallocation flag is allocated on each of all the pixels, the motion vector correction apparatus 1 goes to step S61.

In step S61, the motion vector selector 24 will select a motion vector according to the reallocation flag allocated on each of the pixels. When the reallocation flag is "S", the motion vector (Vx, Vy) is taken as (0, 0). Also, in case the reallocation flag is "A", the motion vector selector 24 will select the motion vector of the left upper-adjacent pixel 83. In case the reallocation flag is "B", the motion vector selector 24 will select the motion vector of the upper-adjacent pixel 84. In case the reallocation flag is "C", the motion vector selector 24 will select the motion vector of the left upper-adjacent pixel 83. In case the reallocation flag is "D", the motion vector selector 24 will select the motion vector of the left-adjacent pixel 82. Further, in case the reallocation flag is "M", "N" or "E", the motion vector selector 24 will select a motion vector determined by the block matching calculator 11 as it is.

Figure 15:
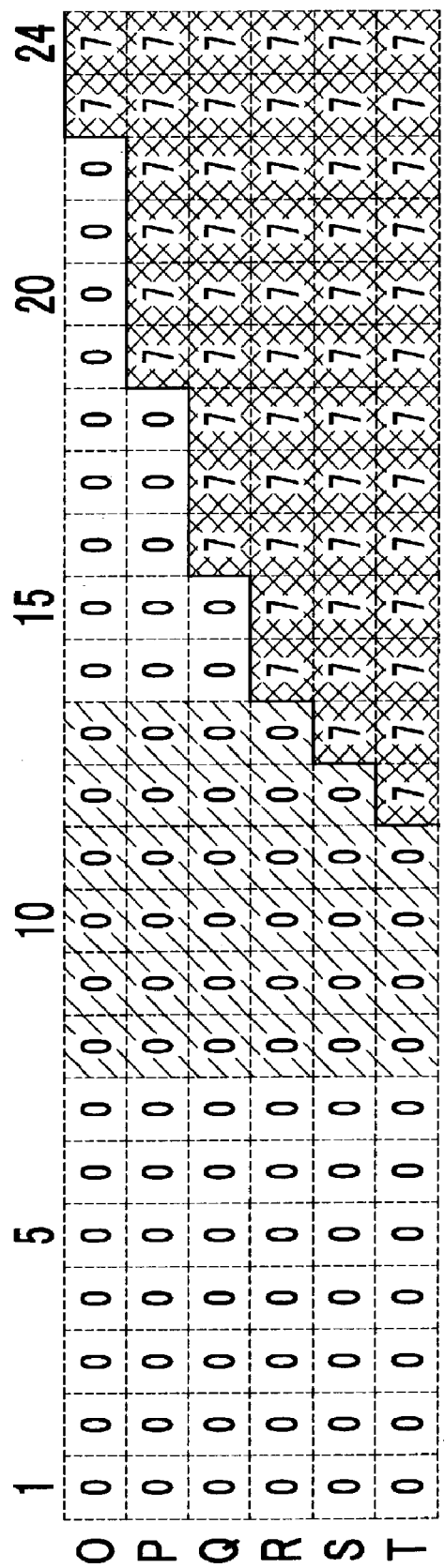
FIG. 15 shows a motion vector selected for each of the pixels according to the reallocation flag.

The result of motion vector selection made according to the allocated reallocation flags as shown in FIG. 14 is shown in FIG. 15. In FIG. 15, "0" stated in the place of each pixel means that the motion vector (Vx, Vy) is (0, 0). Also, "7" means that the motion vector (Vx, Vy) is (0, 7). Namely, it will be seen that there has been correctly selected a motion vector indicating that each of the pixels included in the image of the person 152 moves over seven pixels to the left.

Since the motion vector correction apparatus 1 according to the present invention can correct a motion vector in blocks, determined by the block matching method, to an accurate motion vector in pixels even if pixels forming together a block move differently from each other, so it is possible to prevent a frequency-doubled image from being degraded in quality.

Especially, since the motion vector correction apparatus 1 can first correct a motion vector in units of a block and then correct the motion vector in units of a pixel in steps S11 and S12, it can make the motion vector correction with a considerably reduced amount of operation as compared with the determination of a motion vector on each of all pixels by the block matching method. Also, since the motion vector correction apparatus 1 can allocate a reallocation flag on each pixel according to the results of determination by the stationary/non-stationary-state determination block 16 and coincidence determination block 18 and also can determine, by means of the correlation determination block 21, a correlation of adjacent pixels 8 lying at the boundary between a stationary image and non-stationary image, where the correlation determination is difficult, with a pixel of interest, so it can make the motion vector correction with a considerably reduced amount of operation and an improved accuracy.

Note that the present invention is not limited to the aforementioned embodiment. For example, the interlaced image signal supplied to the aforementioned motion correction system 9 may be a signal converted by the field frequency doubler circuit 260 to have a double field frequency. The field frequency doubler circuit 260 is provided to prevent the screen flicker by improving the resolution. For example, in the PAL system, the field frequency doubler circuit 260 converts an image signal whose field frequency is 50 Hz into a one whose field frequency is 100 Hz by a processing such as an interpolation or the like.

Figure 16:
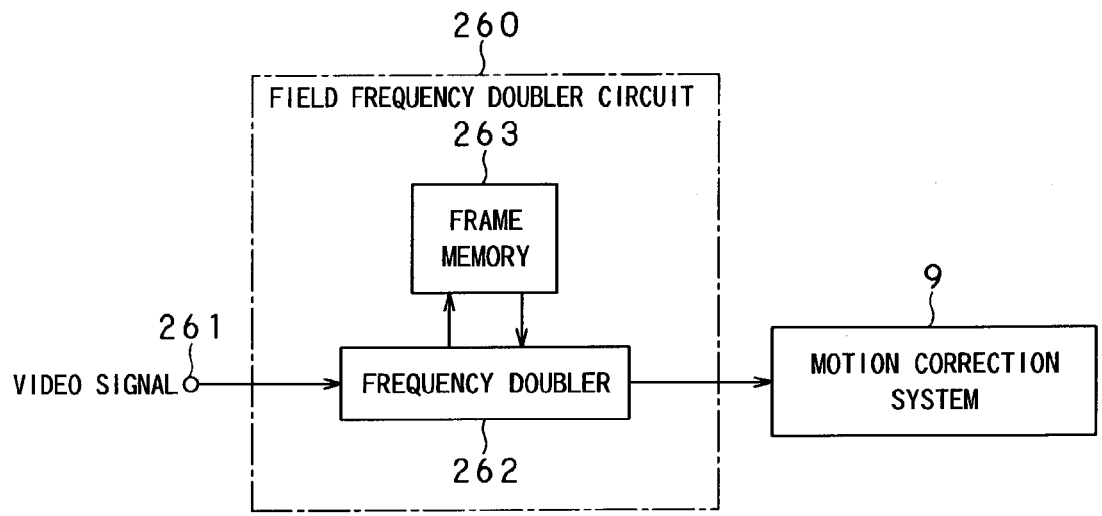
FIG. 16 shows an example connection of a field frequency doubler circuit to the motion correction system.

The field frequency doubler circuit 260 includes an input terminal 261 connected to a TV receiver, frequency doubler circuit 262 and a frame memory 263 as shown in FIG. 16.

The frequency doubler circuit 262 is supplied with telecine-converted image signal from the TV receiver via the input terminal 261 and writes the signal into the frame memory 263. The frequency doubler circuit 262 reads the image signal once written to the frame memory 263 at a speed double that at which the signal has been written. Thus, the frequence of image signal of a film image of 50 fields/sec in the PAL system is doubled. That is, image signal of 100 fields/sec can be reproduced. The frequency doubler circuit 262 sends the double-frequency image signal to the motion correction system 9.

Figures 17A, 17B:
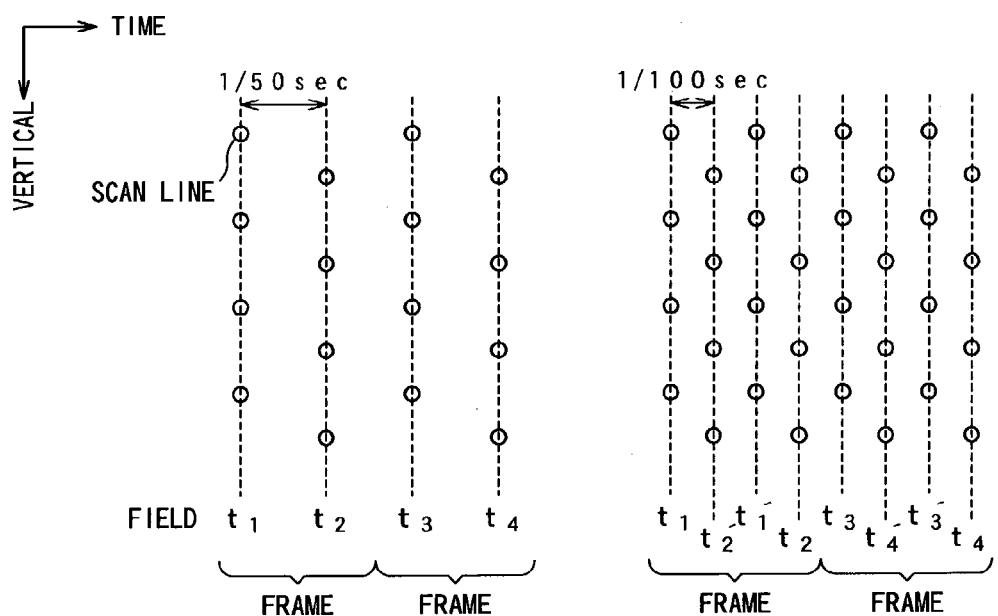
FIGS. 17A and 17B show interlaced image signals before and after subjected to frequency-doubling conversion.

FIGS. 17A and 17B show the relation between each field before and after subjected to frequency doubling in the field frequency doubler circuit 260 and the pixel position. In FIGS. 17A and 17B, the horizontal axis indicates a time, while the vertical axis indicates a vertical position of a pixel.

The image signal before being frequency-doubled is interlaced image signal of 50 fields/sec in the PAL and forms one frame from two fields thereof as shown in FIG. 17A.

On the other hand, since the frequency-doubled image signal is a 100-fields/sec interlaced one, two fields t2' and t1' are newly produced between the fields t1 and t2 and two fields t4' and t3' are also newly produced between the fields t3 and t4 without generation of any fields between the fields t2 and t3. Say, in the image signal, one frame will be formed from four fields.

Each of the newly formed fields t1', t2', . . . may have its own pixel value determined as a mean value, respectively, of three pixels surrounding-that pixel by a median filter or the like in some cases as shown in FIG. 17B. Also, the new fields t1', t2', . . . will have the same contents as the fields t1, t2, . . . , respectively. With the number of screens per unit time thus increased, four fields will form one frame, and the resolution can be improved and screen flicker can be suppressed.

Figure 18A:
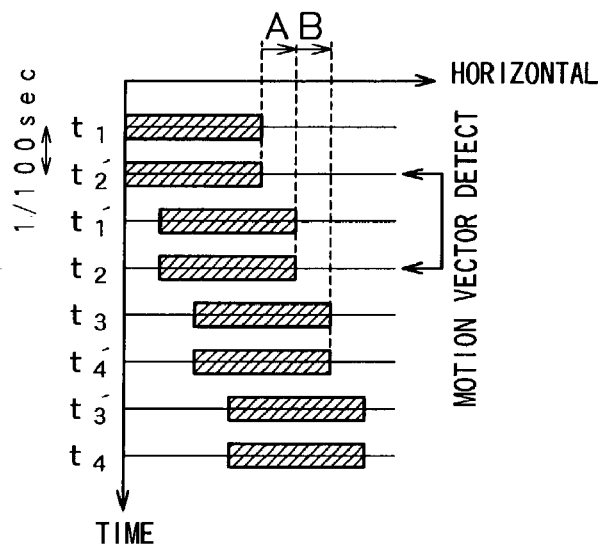
FIGS. 18A and 18B show the relation between each field and image position when a frequency-doubled image is shifted horizontally.

FIG. 18A shows the relation between each field and pixel position in case that image signal in which one frequency-doubled frame is formed from four fields is shifted horizontally by the motion correction system 9. In FIG. 18A, the horizontal axis indicates a horizontal position of an image, while the vertical axis indicates a time. An image whose field frequency has already been double is supplied in the sequence of fields t1, t2', t1' and t2 to the image memory 61 at constant time intervals. The fields t1 and t2' have pixels in the same position, and also the fields t1' and t2 have pixels in the same position.

Figure 18B:
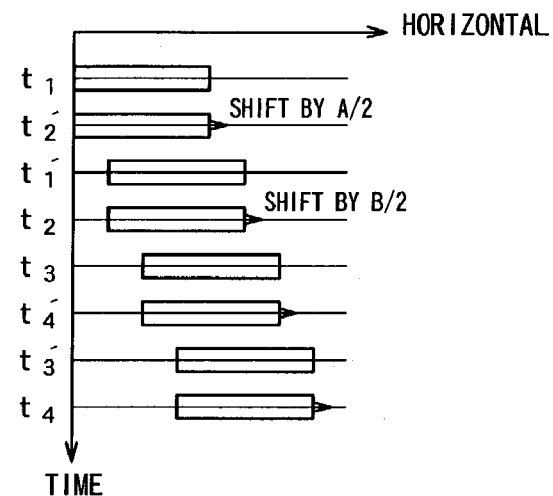

The motion vector correction apparatus 1 determines a motion vector between these fields (frames) as above. As shown in FIG. 18B for example, when the quantity of a motion vector determined between the fields t1 and t1' is A, the image shifter 62 will shift the field t2' in an intermediate position between the fields t1 and t1' by A/2. Also, when the quantity of a determined motion vector between the subsequent fields is B, the image shifter 62 will also shift the intermediate field by B/2.

Figure 19:
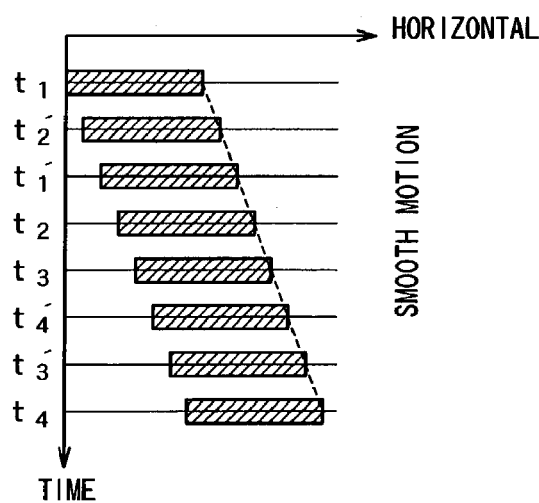
FIG. 19 shows the result of motion correction of a frequency-doubled image.

Repeating the above operations, an image whose frequency-doubled frame is composed of four fields as shown in FIG. 19 can shown a smoother motion.

In case that a motion vector determined by the block matching method is outside a search range, the motion vector correction apparatus 1 according to the present invention can correct the motion vector so that it will match a real image motion. So, by doubling the field frequency of image signal, it is possible to move an image more smoothly, reduce the image quality degradation. These effects in combination will assure the user of quality images.

Also, the present invention is not limited to the embodiment having been illustrated and explained in the foregoing but can of course be applied to a signal converter or the like which is used in connection with a TV receiver, for example. Also the motion vector detector according to the present invention cannot only be implemented as a circuit, hardware or the like but also as a software in a processor.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

As having been described in the foregoing, in the motion vector correction apparatus and method according to the present invention, it is determined whether each block including a plurality of pixels extracted from a basic field has an edge or not, it is determined in which state, stationary or non-stationary, each of the pixels in a block determined to have an edge is, it is determined, on the basis of an absolute value of a difference calculated between a pixel determined to be in the non-stationary state and a pixel in each pixel position in a reference field or an adjacent pixel, if the pixel is correlated with the non-stationary pixel or adjacent pixel, and a motion vector determined by the block matching method according to results of the determination is allocated to each pixel.

Since the motion vector correction apparatus and method according to the present invention can accurately correct a motion vector of each pixel even in case pixels included in a block move differently from each other, so it is possible to prevent a frequency-doubled image from being degraded in quality. Also, since the motion vector correction apparatus and method can correct the motion vector in units of a block, and then in units of a pixel, so it can correct the motion vector with a considerably reduced amount of operation as compared with the motion vector determination of all pixels by the block matching method. Further, since the motion vector correction apparatus and method can correct the motion vector with a high accuracy even with pixels in an area where the correlation determination is not easy, such as boundary between a stationary image and non-stationary image by allocating a reallocation flag on each of the pixels according to results of determination by the stationary/non-stationary-state determination block and coincidence determination block.

What is claimed is:

1. A motion vector correction circuit which corrects a motion vector determined by the block matching method, on each of pixels in a basic field that is one frame before a reference field supplied thereto, the circuit comprising:

an edge determining means for determining whether each block including a plurality of pixels extracted from the basic field has an edge or not;

a stationary/non-stationary-state determining means for determining in which state, stationary or non-stationary, each of the pixels forming together one of the blocks which has been determined by the edge determining means to have an edge is, on the basis of an absolute value of a difference between the pixel and a pixel in the same pixel position in the reference field;

a correlation determining means for calculating an absolute value of a difference between a pixel having been determined by the stationary/non-stationary-state determining means to be non-stationary and a pixel in each pixel position in the reference field to determine a correlation between such pixels;

a peripheral pixel determining means for calculating an absolute value of a difference between a pixel on which no correlation is found and pixels adjacent to the pixel in the basic field to determine a correlation between the non-correlative pixel and one of the adjacent pixels on the basis of the difference absolute-value thus calculated; and a motion vector allocation means for allocating, to each of the pixels, a motion vector determined by the block matching method according to results of the determination made by the edge determining means and stationary/non-stationary-state determining means and by the correlation determining means and peripheral pixel determining means.

2. The circuit as set forth in claim 1, further comprising a motion vector detecting means for determining, by the block matching method, the motion vector between a block extracted from the basic field and a block extracted from the reference field and moved within a search range.

3. The circuit as set forth in claim 1, further comprising a flag generating means for generating a flag on each of the pixels according to results of the determination made by the edge determining means and stationary/non-stationary-state determining means and by the correlation determining means and peripheral pixel determining means;

wherein the motion vector allocation means allocates the motion vector on each of the pixels according to a flag generated by the flag generating means.

4. The circuit as set forth in claim 1, wherein the stationary/non-stationary-state determining means determines that each of pixels forming together a block determined to have an edge is stationary in case that the calculated difference absolute-value is smaller than a predetermined threshold.

5. The circuit as set forth in claim 1, wherein the correlation determining means finds the correlation between the pixels in case that the calculated difference absolute-value is smaller than a predetermined threshold.

6. The circuit as set forth in claim 1, wherein the peripheral pixel determining means determines the correlation on one of the adjacent pixels whose difference absolute-value is minimum.

7. The circuit as set forth in claim 1, wherein the peripheral pixel determining means calculates a difference absolute-value between the non-correlative pixel and left upper, upper, right upper and left pixels adjacent to the non-correlative pixel to determine a correlation on the non-correlative pixel with the adjacent pixel in case that the calculated difference absolute-value is smaller than a predetermined threshold.

8. The circuit as set forth in claim 1, wherein the motion vector allocation means operates to:
   allocate the determined motion vector to the blocks having been determined by the edge determining means to have no edge;
   take, as zero, the motion vector of a pixel having been determined by the stationary/non-stationary-state determining means to be stationary;
   allocate the determined motion vector to a pixel having been determined by the correlation determining means to have a correlation with one of its adjacent pixels; and
   allocate the motion vector of one of the adjacent pixels determined to have the correlation, as it is, to the pixel having been determined by the peripheral pixel determining means to have a correlation with the non-correlative pixel.

9. A motion vector correction method of correcting a motion vector determined by the block matching method, on each of pixels in a basic field that is one frame before an input reference field, the method comprising the steps of:
   determining whether each block including a plurality of pixels extracted from the basic field has an edge or not;
   determining in which state, stationary or non-stationary, each of the pixels forming together one of the blocks which has been determined in the edge determining step to have an edge is, on the basis of an absolute value of a difference between the pixel and a pixel in the same pixel position in the reference field;
   calculating an absolute value of a difference between a pixel having been determined in the stationary/non-stationary-state determining step to be non-stationary and a pixel in each pixel position in the reference field to determine a correlation between such pixels;
   calculating an absolute value of a difference between a pixel on which no correlation is found and pixels adjacent to the pixel in the basic field to determine a correlation between the non-correlative pixel and one of the adjacent pixels on the basis of the difference absolute-value thus calculated; and
   allocating, to each of the pixels, a motion vector determined by the block matching method according to results of the determination made in the edge determining step and stationary/non-stationary-state determining step and in the correlation determining step and peripheral pixel determining step.

10. The method as set forth in claim 9, further comprising a motion vector detecting step for determining, by the block matching method, the motion vector between a block extracted from the basic field and a block extracted from the reference field and moved within a search range.

11. The method as set forth in claim 9, further comprising a flag generating step for generating a flag on each of the pixels according to results of the determination made in the edge determining step and stationary/non-stationary-state determining step and in the correlation determining step and peripheral pixel determining step;
   wherein, in the motion vector allocation step, the motion vector is allocated on each of the pixels according to a flag generated by the flag generating means.

12. The method as set forth in claim 9, wherein, in the stationary/non-stationary-state determining step, it is determined that each of pixels forming together a block determined to have an edge is stationary in case that the calculated difference absolute-value is smaller than a predetermined threshold.

13. The method as set forth in claim 9, wherein, in the correlation determining step, there is found the correlation between the pixels in case that the calculated difference absolute-value is smaller than a predetermined threshold.

14. The method as set forth in claim 9, wherein, in the peripheral pixel determining step, there is found the correlation on one of the adjacent pixels whose difference absolute-value is minimum.

15. The method as set forth in claim 9, wherein, in the peripheral pixel determining step, there is calculated a difference absolute-value between the non-correlative pixel and left upper, upper, right upper and left pixels adjacent to the non-correlative pixel to determine a correlation on the non-correlative pixel with the adjacent pixel in case that the calculated difference absolute-value is smaller than a predetermined threshold.

16. The method as set forth in claim 9, wherein, in the motion vector allocation step:
   the determined motion vector is allocated to the blocks having been determined by the edge determining means to have no edge;
   the motion vector of a pixel having been determined by the stationary/non-stationary-state determining means to be stationary is taken as zero;
   the determined motion vector is allocated to a pixel having been determined by the correlation determining means to have a correlation with one of its adjacent pixels; and
   the motion vector of one of the adjacent pixels, determined to have the correlation, is allocated as it is to the pixel having been determined by the peripheral pixel determining means to have a correlation with the non-correlative pixel.

* * * * *